(12) United States Patent
Peters et al.

(10) Patent No.: US 9,181,034 B2
(45) Date of Patent: Nov. 10, 2015

(54) OVERHEAD CONVEYOR SYSTEM FOR CONVEYING PACKAGING TRAYS

(75) Inventors: Erik Hendrikus Werner Peters, Boxmeer (NL); Wilbert Hiddink, Varseeveld (NL); Adrianus Josephes van den Nieuwelaar, Gemert (NL)

(73) Assignee: Marel Stork Poultry Processing B.V., Boxmeer (NL)

( * ) Notice: Subject to any disclaimer, the term of this patent is extended or adjusted under 35 U.S.C. 154(b) by 1044 days.

(21) Appl. No.: 13/145,521

(22) PCT Filed: Jan. 22, 2010

(86) PCT No.: PCT/NL2010/000009
§ 371 (c)(1),
(2), (4) Date: Jul. 20, 2011

(87) PCT Pub. No.: WO2010/085141
PCT Pub. Date: Jul. 29, 2010

(65) Prior Publication Data
US 2011/0277420 A1    Nov. 17, 2011

(30) Foreign Application Priority Data

Jan. 22, 2009 (NL) ..................... 2002441

(51) Int. Cl.
*B65B 1/00* (2006.01)
*B65G 37/00* (2006.01)
(Continued)

(52) U.S. Cl.
CPC ............... *B65G 17/20* (2013.01); *B65B 7/164* (2013.01); *B65G 47/61* (2013.01); *B65G 47/763* (2013.01); *B65G 47/844* (2013.01); *B65G 2201/0261* (2013.01)

(58) Field of Classification Search
CPC ........ B65B 43/46; B65B 7/162; A22C 21/00; A22C 25/00; A22C 18/00; A22B 5/00; A23B 4/28; A23B 4/30; A23B 4/32; A21C 9/04; A23P 1/08; B05B 5/08; B05B 13/02; B65D 81/28
USPC ............. 53/52, 55, 64, 67, 69, 237, 249, 502, 53/329.9, 131.2, 131.3, 131.4, 431
See application file for complete search history.

(56) References Cited

U.S. PATENT DOCUMENTS 3,528,539 A    9/1970 Speaker et al.
4,081,071 A    3/1978 Nielsen
(Continued)

FOREIGN PATENT DOCUMENTS

CH    614 176 A5    11/1979
EP    0 629 566 A2    12/1994
(Continued)

*Primary Examiner* — Andrew M Tecco
*Assistant Examiner* — Praachi M Pathak
(74) *Attorney, Agent, or Firm* — Birch, Stewart, Kolasch & Birch, LLP

(57) ABSTRACT

A food processing system for processing food products includes a food processing device for processing food products, at least one filling station at which packaging trays are filled with those food products, and a conveyor system configured for conveying the packaging trays. The food processing system also includes a distribution control system configured for linking product information, in the form of one or more characteristics of the packaging trays and/or the food products in said trays, to the respective packaging tray, and for activating the conveyor system, the at least one filling station and the food processing device, and for activating two or more export stations.

23 Claims, 17 Drawing Sheets

(51) Int. Cl.
*B65G 47/00* (2006.01)
*B65G 17/20* (2006.01)
*B65B 7/16* (2006.01)
*B65G 47/61* (2006.01)
*B65G 47/76* (2006.01)
*B65G 47/84* (2006.01)

(56) References Cited

U.S. PATENT DOCUMENTS

| | | | |
|---|---|---|---|
| 4,240,353 A | 12/1980 | Barth | |
| 5,288,194 A | 2/1994 | Ueda et al. | |
| 7,089,717 B2 * | 8/2006 | Guttinger et al. | 53/475 |
| 2004/0221549 A1 * | 11/2004 | Guttinger et al. | 53/443 |
| 2005/0279613 A1 | 12/2005 | Ufland et al. | |
| 2008/0092488 A1 * | 4/2008 | Gabrielsen et al. | 53/428 |

FOREIGN PATENT DOCUMENTS

| | | |
|---|---|---|
| EP | 1 115 121 A1 | 7/2001 |
| EP | 1 972 579 A1 | 9/2008 |
| GB | 678869 | 9/1952 |
| JP | 53-128873 | 11/1978 |
| JP | 63-37622 U | 3/1988 |
| JP | H01-228450 A | 9/1989 |
| JP | H06-040549 A | 2/1994 |
| JP | H06-270906 A | 9/1994 |
| JP | 2008-050062 A | 3/2008 |
| WO | WO 94/22162 A1 | 9/1994 |
| WO | WO 2005102063 A2 * | 11/2005 ............. A22C 21/00 |
| WO | WO 2006/010220 A1 | 2/2006 |

* cited by examiner

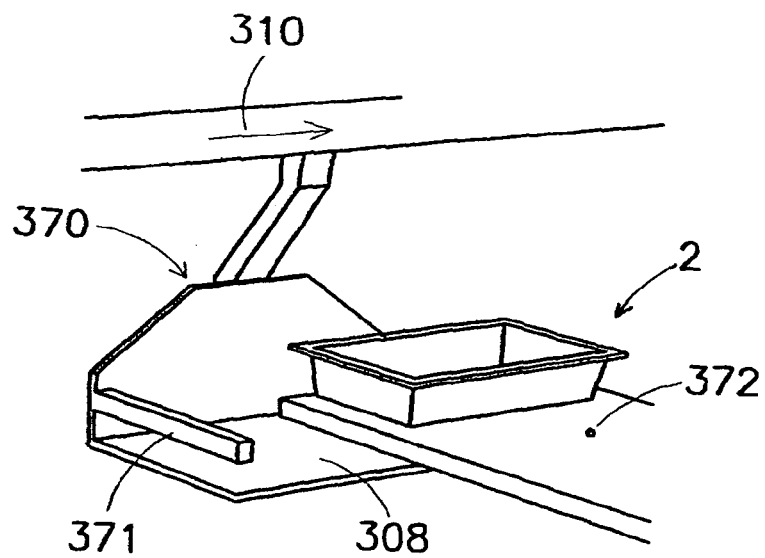
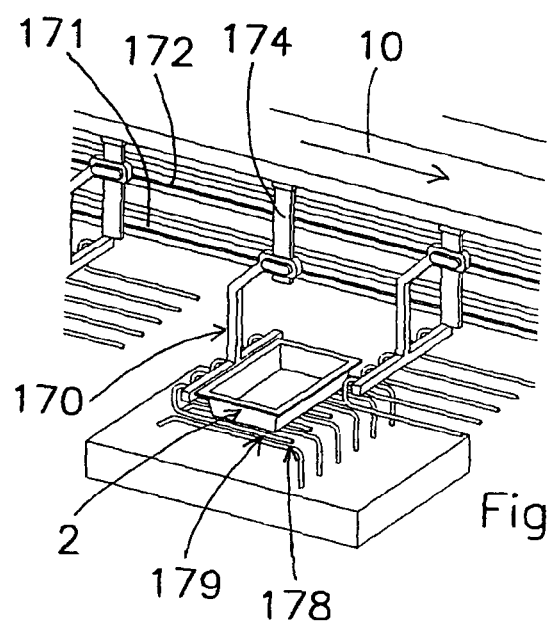
Fig 16
Fig 17
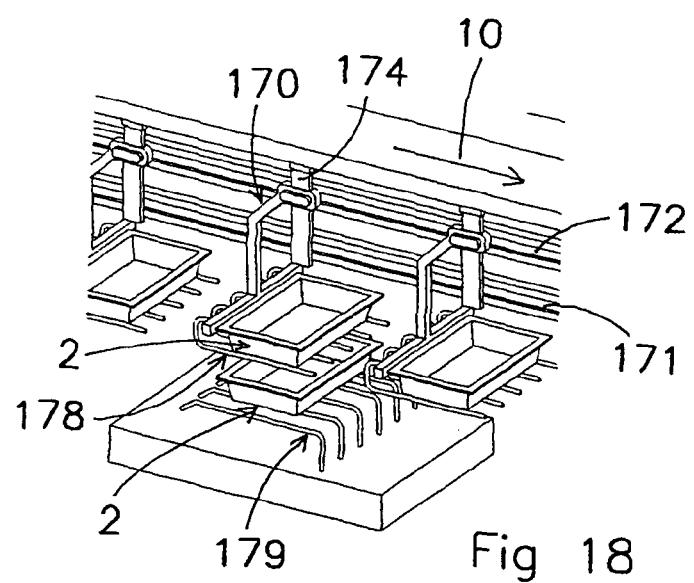
Fig 18

OVERHEAD CONVEYOR SYSTEM FOR CONVEYING PACKAGING TRAYS

The invention relates to the field of the processing of food products, in particular meat products, more particularly poultry such as chicken or parts thereof.

The meat processing industry, for example, makes large-scale use of products packaged in packaging trays. For example, in the poultry processing industry, poultry parts such as chicken legs, chicken fillets, but also hamburgers resulting from the processing process, are placed in packaging trays. These packaging trays are subsequently conveyed to machines which seal the packaging trays with a film. Said sealed packaging trays are afterwards collected on the basis of orders from the customers of the poultry processing industry, often on behalf of supermarket chains which, in turn, display the packaging trays in refrigerated display cases in the supermarket. Finally, the consumer purchases the product packaged in the packaging tray.

The poultry processing industry often makes use of a conveyor system in order to convey packaging trays filled with poultry parts to the machines which attach the film and/or in order to displace the packaging trays to stations where orders are collected, for example in conveying crates. A known conveyor system for this purpose consists of a conveyor formed by a conveyor belt or a roll track. At various places along the conveyor, staff stand at import stations in order to manually place the trays on the conveyor and, downstream thereof, staff stand at various places at export stations manually taking trays off the conveyor. The packaging trays are placed on the conveyor belt and taken from the conveyor belt by hand in order to prevent the packaging trays, which are usually fragile, from breaking or becoming otherwise damaged and in order to prevent the products from shifting in the trays, so that the consumer does not benefit from the attractive presentation, or even preventing products from falling right out of the trays before the trays have been sealed.

A drawback of exporting the packaging trays by hand is that staff are relatively expensive compared to automated systems.

A further drawback of this known solution is the fact that the conveyors used are sizeable systems which take up an undesirably large amount of floor space. Furthermore, the known conveyors, in particular conveyor belts, have a limited length. Spanning large distances requires a plurality of conveyors to be connected, as a result of which products repeatedly have to be transferred to a following conveyor. This makes systems of this type complex, susceptible to malfunction and expensive.

The known systems are not satisfactory from the point of view of soiling and cleaning either. Still a further drawback of the known conveyor systems is the fact that the staff who take the trays from the belt can make their choice only on the basis of that which they can directly visually perceive on the exterior of the tray. No further information is available. As a result, a system of this type also does not allow the food products present in the trays to be distributed over various export stations as a function of particular information relating to the food products, for example the origin, quality, etc.

Furthermore, the known conveyor systems utilize what is known as a carousel for buffering products. In a buffer of this type, the conveyor which conveys the products along the export stations is embodied as an endless track. Products which are not initially exported, for example as a result of the limited capacity of an export station, are thus conveyed repeatedly along the export station until the product is exported in the export station. At the same time, new products are supplied to the empty locations in the buffer. Because the export stations do not comprise any information about which products have already been present in the buffer and for how long, it may be that products placed in the buffer later are exported before products which were placed in the buffer long beforehand. This is particularly undesirable in the conveying of food products wherein the quality of a product can deteriorate over the course of time.

Apart from in the meat processing industry, the packaging of food products in packaging trays is also used on a large scale in other sectors of the food industry. In the fish processing industry, fillets of fish are for example packaged in packaging trays. It is also known to package fruit and vegetables, for example, in packaging trays.

The invention seeks to provide a system for conveying packaging trays allowing one or more of the abovementioned drawbacks to be at least partially eliminated.

The invention provides a conveyor system in accordance with claim 1.

The invention also provides a method according to claim 21, a food product according to claim 24 and an abattoir facility according to claim 25.

A conveyor system according to claim 1 comprises a rail following an endless conveyor track and a multiplicity of trolleys which are movably connected to the rail and are preferably connected to one another, for example via one or more chain elements. A multiplicity of tray carriers are each coupled via at least one trolley to the rail for forming a chain of tray carriers for conveying packaging trays along the conveyor track from one or more import stations to one or more export stations. The conveyor system is also provided with drive means configured for displacing tray carriers in a direction of conveyance along the conveyor track. The conveyor system also preferably comprises a control system.

A conveyor system provided with a chain of trolleys connected to a rail following an endless conveyor track is also referred to in the field as a "chain conveyor" or "cable conveyor" and is for example used in devices for processing food products such as slaughter lines, for example slaughter lines for poultry.

The use of a chain conveyor of this type in combination with tray carriers for conveying packaging trays has the advantage over the use of a roll track, for example, that the system takes up relatively little floor space. In addition, a chain conveyor is a robust system and thus has low susceptibility to malfunction.

The use of a chain conveyor even allows the conveyor system to be suspended in a simple manner from, for example, a ceiling, girders or gantries spanning the workshop floor, so that the workshop floor can be kept as free as possible.

The conveyor system comprises at least one import station configured for, preferably selectively, importing the trays into the tray carriers and at least one export station configured for preferably selectively exporting the packaging trays from the tray carriers. The term "selectively importing and exporting" refers to importing/exporting or not importing/exporting a packaging tray into or out of said tray carrier on the basis of information, for example whether a particular tray carrier does or does not comprise a packaging tray. This is in contrast to non-selective importing and exporting wherein a packaging tray is imported or exported each time a tray carrier passes. Selective importing can be carried out in that the import station selectively imports the packaging trays into the tray carriers and selective exporting can be carried out in that the export station selectively exports the packaging trays from the tray carriers. Alternatively, selective importing and exporting can be carried out in that the carriers selectively accommodate the packaging trays in the import station and respectively deliver them to the export station. A combination of these alternatives is also possible.

Preferably, the conveyor system is provided with a control system configured for determining the position of each tray in the conveyor system. A control system of this type comprises chain-locating means which can determine the position of the chain of tray carriers with respect to a fixed point along the conveyor track, for example an import station, an export station or a treatment station.

The control system is also preferably provided with receiving means for receiving information about tray carriers and/or product information concerning the packaging trays and/or the contents of packaging trays, which information is received by, for example, an import station, an export station, a treatment station or a processing system.

A control system of this type is also preferably provided with electronic memory means with a memory table. The memory table comprises, for each packaging tray in the conveyor system, at least one memory field for accommodating at least one characteristic of the tray and/or contents of said tray. The memory table also comprises at least one memory field for storing the carrier in which the tray is placed by an import station. Because the position of the tray carriers is continuously known, the position of the tray carried by the tray carrier is also continuously known.

In this way, a conveyor system according to the invention is configured for linking product information, in the form of one or more characteristics of the tray and/or the food products in said tray, to each individual packaging tray. On the basis of this product information, the packaging trays can for example be distributed over various export stations, or treatment stations can be activated.

Preferably, the import stations and the export stations are provided with an import device and export device respectively for feeding, in a position with a substantially horizontal orientation, the packaging trays into and out of the tray carriers. As a result of the substantially horizontal orientation of the packaging tray during importing and exporting, it is possible to convey open trays, that is to say trays, the opening of which has not yet been sealed with a film, for example. The risk of food products falling out of the open packaging tray is minimal when the packaging tray is in a position with a substantially horizontal orientation.

The advantage of conveying open trays is, for example, that one or more treatments can still be carried out on the products placed in the tray, for example adding a marinade to meat products placed in the packaging tray. It is also still possible to place one or more objects, for example, such as a packet of marinade, a sachet of herb butter, etc. in the tray.

In an advantageous embodiment, the import station is provided with an import track extending along the conveyor track, which import station is provided with an import plane, extending preferably in a substantially horizontal direction, and which import plane is defined by parallel rolls which extend in that import plane and are positioned at an angle to the conveyance direction, preferably at an angle of substantially 45 degrees, the point of the angle being directed in the opposite direction to the conveyance direction in such a way that the rolls exert a pushing force on a conveyed tray which is advanced over the import plane in the conveyance direction, which pushing force is directed toward the conveyor track for importing the packaging tray into a tray carrier.

A conveyor system according to the invention can be used for distributing various sizes of open packaging trays over packaging devices for sealing the packaging tray with a film.

In the text of this application, the term "sealing" is used to describe the sealing of a packaging tray with a film.

A conveyor system according to the invention is preferably provided with export means for engaging with a packaging tray placed on a support platform of a tray carrier and exerting a push-out force on said packaging tray for pushing said packaging tray out of the carrier.

A conveyor system of this type is able to push a packaging tray out of the carrier in a desired direction actively and in a controlled manner and preferably at a controlled speed.

This has the advantage that there is no or only little uncertainty in the export of the packaging trays from the tray carriers. In addition, all the packaging trays can be exported at a specific place and at a uniform speed. This is particularly important when the conveyor system conveys various types of packaging trays and/or packaging trays having different contents. The risk of damage to the packaging trays is also minimal.

In addition, a conveyor system with export means according to the invention is able to move the packaging trays in a controlled manner from a horizontally oriented support platform. Preferably, a conveyor system according to the invention is provided with a support platform with a fixed, substantially horizontal orientation for conveying a packaging tray in a position with a substantially horizontal orientation. This makes a conveyor system of this type particularly suitable for conveying food products in open packaging trays, for example.

In a further preferred embodiment, a conveyor system according to the invention is provided with import means configured for engaging with a packaging tray in an import station and exerting an importing force on said packaging tray for importing said packaging tray into a tray carrier at that import station in a desired direction actively and in a controlled manner and preferably at a controlled speed.

This has the advantage that there is no or only little uncertainty in the export of the packaging trays from the tray carriers. In addition, all the packaging trays can be exported at a specific place and at a uniform speed. This is particularly important when the conveyor system conveys various types of packaging trays and/or packaging trays having different contents. The risk of damage to the packaging trays is also minimal.

Preferably, a conveyor system according to the invention is provided with export means which are activated by a distribution control system which can selectively export the packaging trays on the basis of the product information. A conveyor system of this type can for example distribute packaging trays over various export stations on the basis of the best-before date of the food products packaged in the packaging trays.

This allows the packaging trays and the food products packaged therein to be distributed over various export stations in a fully automatic manner. As a result, the conveyor system is less expensive and more efficient than the use of export stations wherein the packaging trays are taken manually from a conveyor track.

Preferably, the conveyor system is provided with one or more treatment stations for carrying out treatments on the packaging trays and/or the food products placed in the packaging trays. Treatments on the packaging tray and/or the contents thereof can for example comprise weighing the packaging tray, scanning the packaging tray, for example in order to check the contents thereof for the presence of metal or undesirable bone parts in meat products, optically scanning the food products placed in a packaging tray for determining the colour and/or the position, adding an edible additive to the packaging tray and/or the contents thereof in the form of a packet and/or a marinade.

The carrying-out of a treatment is preferably activated by the control system as a function of the information available in the memory of the control system about the packaging tray in question or the products in the packaging tray in question. This has the advantage that information of this type does not for example have to be obtained by the treatment system itself by scanning the contents of a packaging tray prior to the treatment. This simplifies the process and reduces the risk of faults.

A conveyor system of this type thus allows various products to be conveyed and/or products to be subjected to various treatments in a conveyor track simultaneously and in a simple manner. A conveyor system of this type can assemble orders in a flexible manner. For example, a conveyor system allows no, all or a portion of the packaging trays from which the order is assembled to be provided, as a function of the wishes of a customer, with an additive, for example in the form of a packet of sauce.

The invention also provides a processing system for processing food products, preferably meat products. A processing system of this type comprises a processing device for processing food products, at least one filling station configured for filling the packaging trays with food products supplied from the processing device, and a conveyor system configured for conveying packaging trays from one or more import stations to one or more export stations.

The conveyor system comprises a multiplicity of trolleys and tray carriers. The tray carriers are coupled via the trolleys to a rail following an endless conveyor track and thus form a chain of tray carriers.

The tray carriers are each provided with a support member, preferably a support platform, configured for supporting at least one packaging tray.

The tray carrier is preferably provided with an entrainment means for a packaging tray, movable between an entrainment position, in which the entrainment means protrudes outside the tray carrier and makes contact with a side of a packaging tray, for example during the importing and/or exporting of the packaging tray, and a retracted position, in which the entrainment means is preferably located within the contour of the tray carrier, and the entrainment means preferably being coupled to export means, preferably to an export member, of the tray carrier.

In a further embodiment, the shape of the entrainment means is adapted to the shape of the packaging trays to be conveyed. This has the advantage that the grip of the entrainment means on the packaging tray is optimal.

The tray carrier is preferably provided with a roof part extending above at least one packaging tray arranged on the support surface and preferably over the entire support platform in order in this way to cover at least the packaging tray and the contents thereof.

In an advantageous embodiment, the roof part is connected to the support member of the tray carrier merely along a side of the tray carrier opposing a side for importing and exporting packaging trays, in such a way that the tray carrier is at least partially open at three sides and preferably describes a C shape when viewed from the side.

In a further preferred embodiment, the roof part of the tray carrier is embodied as, and/or provided with, for example as a component of a connecting element, a contact surface for interaction with guide rails extending along the top of the conveyor track, for stabilizing the tray carrier.

The processing system also comprises drive means configured for displacing the chain of tray carriers in a direction of conveyance along the conveyor track, and a control system for activating the conveyor system, configured for determining the position of each tray in the conveyor system.

The advantage of a food processing system of this type is that fewer or no people are necessary for distributing the packaging trays over the plurality of export stations. This reduces the number of faults and a higher throughput speed can be achieved.

Preferably, the distribution control system of the food processing system is configured for linking product information obtained from the processing process and/or from the filling station to the packaging trays in which the food products are packaged. This preserves, for each packaging tray, the product information of the food products packaged in said tray and/or information about the type of tray used, for example. This information can for example be used for distributing the packaging trays over various export stations and/or treatment stations.

For example, in the meat processing industry, the external appearance and/or the weight of each cut of meat can be ascertained during the processing process, such as is known in poultry. A choice is for example subsequently made as to whether or not to marinade the cuts of meat depending on the weight and/or the external appearance, for example the colour of the meat. In the currently known systems, the information concerning cuts of meat is lost when the cuts of meat are placed in a packaging tray.

In a processing system according to the invention, this product information is preserved when the food products are placed in the tray. For each tray, it is possible to decide whether or not the products in said tray must be marinated.

Preferably, a treatment station is provided in the form of a filling station provided with filling means for placing in a tray one or more food products originating from a processing device. Preferably, the filling means are configured for systematically placing the food products in the tray at a certain location and/or in a certain order, in such a way that the position of each placed food product in the packaging tray is known.

In a processing system of this type, product information, for example weight, colour, moisture content, etc., of the food products can be recalculated for the individual food products even after the products have been placed in the tray.

The information concerning the individual food products is in this way preserved up to the end of the conveying process. The information can for example be used for carrying out or not carrying out treatments in treatment stations, for distributing the packaging trays over various orders or for subsequently tracing the origin of individual meat products. The information can for example also be used in the production of labels which are applied to the packaging after the trays are sealed.

This product information is preferably relayed from the processing device, but can for example also be obtained by the control system via detectors before or during filling of the packaging trays.

A conveyor system and a processing system according to the invention are particularly suitable for conveying a plurality of individual food products, for example a plurality of pieces of fruit, meat or fish, placed in a packaging tray, the packaging tray forming part of the final consumer packaging.

A conveyor system and a processing system according to the invention are particularly suitable for conveying trays in which a plurality of food products are placed, and in particular for conveying open trays with food products placed therein, that is to say wholly or partially filled trays which are not yet sealed with a film, for example.

A processing system according to the invention is particularly suitable for conveying food products, information about a plurality of characteristics of the product, for example external appearance, weight, moisture content, origin, being ascertained for each food product during the processing process. The packaged products can be distributed over treatment stations and/or export stations on the basis of this information.

The invention will be explained in greater detail with reference to the drawings, in which:

FIG. 16 shows a further alternative tray carrier according to the invention;

FIG. 17 shows a further alternative tray carrier according to the invention;

FIG. 18 is a second view of the tray carrier from FIG. 17;

The figures are merely schematic representations of the preferred embodiments of the invention. In the figures, like or corresponding components are denoted by the same reference numerals.

Figure 1:
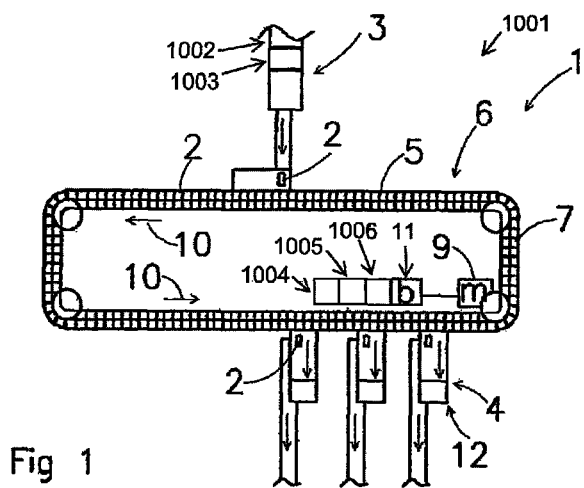
FIG. 1 is a plan view of a food processing system with a conveyor system according to the invention.

FIG. 1 is a schematic plan view of a food processing system 1001 comprising a food processing device 1002, at least one filling station 1003 and a conveyor system 1 according to the invention. The conveyor system is provided with a rail 5 following an endless conveyor track 6, a multiplicity of trolleys and a multiplicity of tray carriers 7.

The multiplicity of trolleys are movably connected to the rail. The trolleys are connected to one another via one or more chain elements, for example links of a chain, a piece of cable or the like. In an alternative embodiment, the carriers are not coupled to one another, for example in a buffer or the like where the carriers are temporarily brought to a variable mutual distance.

The tray carriers 7 are each suspended from the rail 5 via one or more trolleys. The conveyor system is provided with drive means 9 for displacing the chain of tray carriers 7 in a direction of conveyance 10 along the conveyor track 6. The conveyor system is activated by a control system 11 configured as a distribution control system comprising a chain position determining device 1004, a receiving device 1005 configured to receive information and an electronic memory 1006.

The conveyor system 1 depicted in FIG. 1 is configured for conveying various types of open packaging trays 2, all supplied via the one import station 3, to various export stations 4. A packaging device 12 is arranged after each export station for sealing packaging trays 2 with a transparent film. This process is known as sealing.

In practice, packaging devices of this type are suitable for packaging merely a limited number of types of packaging trays. A first packaging device is for example suitable for sealing packaging trays having a height of 4-5 cm and a surface area of 180-220 cm$^2$, and a second packaging device is suitable for sealing packaging trays having a height of 5-7 cm and a surface area of 200-240 cm$^2$, etc.

The conveyor system shown in FIG. 1 is configured for delivering a packaging tray to said packaging device which is suitable for sealing that type of packaging tray. When a tray carrier 7 with a packaging tray 2 passes an export station 4 provided with a packaging device 12 suitable for sealing the packaging tray in question, export means are activated for feeding the packaging tray out of said tray carrier. The packaging tray is subsequently conveyed to the packaging device in question and sealed. After the sealing, the packagings are conveyed onward for further processing.

Preferably, only packaging trays which can be sealed by the packaging devices are supplied, so that all the tray carriers are empty when they return to the import station. In an alternative embodiment, an additional export station can be provided downstream with respect to the export stations, and upstream with respect to the import station, for exporting those packaging trays which are unsuitable for the available packaging devices.

For exporting the packaging trays in the correct packaging devices, the conveyor system is provided with stand-alone export stations. A stand-alone export station comprises detection means for detecting packaging trays in the passing tray carriers and/or packaging trays in said tray carriers and/or the contents of said packaging trays, in particular for detecting information about dimensions, weight, colour, size, etc. A stand-alone export station is also provided with a control system for activating on the basis of said information export means in order in this way to selectively export packaging trays from said passing tray carrier.

In an alternative embodiment, the stand-alone export stations receive information from a central control system of the conveyor system. In an embodiment of this type, the control system of the conveyor system is provided with sending means for sending information about tray carriers and/or packaging trays and/or the contents of the packaging trays to an import station.

A control system of this type also comprises chain position determining means for determining the position of the chain of tray carriers (7) with respect to a fixed point along the conveyor track (6), for example an import station, an export station or a treatment station.

In addition, a control system of this type is provided with receiving means for receiving information about tray carriers and/or product information concerning the packaging trays and/or the contents of packaging trays, which information is received by, for example, an import station or detectors along the conveyor track.

For example, one or more trolleys and/or tray carriers and/or chain elements can be provided with a magnet or with a visually readable code. The receiving means can then be embodied as a sensor for detecting a magnetic pulse or a scanner for registering the visual code.

The central control system also comprises electronic memory means with a memory table comprising, for each packaging tray in the conveyor system, at least one memory field for accommodating at least one item of data which is related to the packaging tray and/or contents of the packaging tray, and comprising at least one memory field for storing a variable which is representative of the tray carrier in which the packaging tray is placed at an import station.

A control system of this type is particularly suitable for updating information concerning packaging trays and/or the contents of said packaging trays.

In a further preferred embodiment, the central control system is configured as a distribution control system for activating the export stations. In an embodiment of this type, the export stations are not provided with a stand-alone control system. The distribution control system comprises the chain position determining means, the receiving means and the electronic memory means as described hereinbefore.

The distribution control system is configured for activating various export stations on the basis of the information known in the memory of the distribution control system about conveyed packaging trays. In this way, the packaging trays can be distributed over the export stations.

Figure 2:
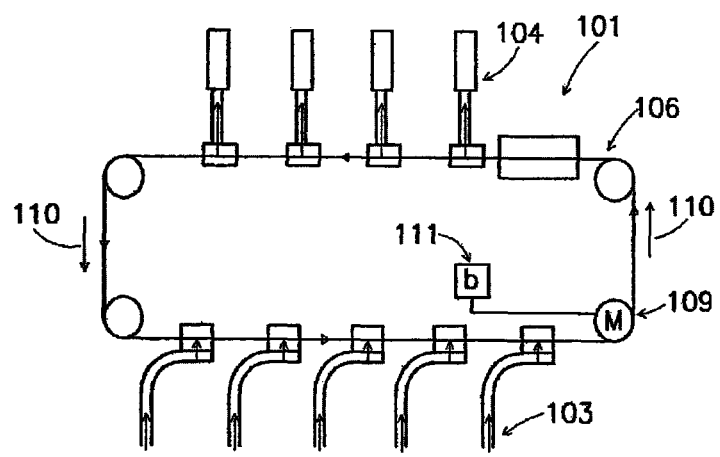
FIG. 2 is a plan view of an alternative conveyor system according to the invention.

FIG. 2 is a schematic plan view of an alternative conveyor system 101 according to the invention. The conveyor system is provided with a rail (not shown) following an endless conveyor track 106, and a chain of tray carriers (not shown). The chain of tray carriers is suspendedly coupled to the rail for conveying packaging trays from five import stations 103, each configured for selectively importing the trays into the tray carriers, to four export stations 4, each configured for selectively exporting the packaging trays from the tray carriers. For displacing the chain of tray carriers in a direction of conveyance 110 along the conveyor track 106, the conveyor system is provided with drive means 109. The conveyor system 101 is activated by a control system 111.

The conveyor system is provided with selective import stations for selectively importing packaging trays, in particular for merely importing packaging trays into empty tray carriers. In a simple version, the conveyor system is provided with stand-alone import stations each provided with detection means along the conveyor track, upstream with respect to the import station, for detecting whether or not the passing tray carrier has room for a packaging tray. The import station can import or not import a packaging tray on the basis of this information.

In an alternative embodiment, a central control system keeps a record, for all the tray carriers, as to whether they are provided with a packaging tray. For example, the one or more import stations can inform the control system which tray carrier they have imported a packaging tray into. Preferably, a conveyor system of this type is provided with two or more import stations, a specific type of food product and/or packaging tray being imported for each import station. For example, it is easily possible to determine, by scanning the tray carriers first upstream and then downstream with respect to an import station, whether a packaging tray has been imported into the import station in question. The central control system is configured for subsequently storing in memory means which import station each packaging tray originates from, and thus what type of food product and/or packaging tray it is.

The information can be passed on to a control system, or control systems, of one or more stand-alone import stations via the control system. In a further embodiment, the central control system can be configured for activating the import stations and/or export stations on the basis of this information.

In an import station or export station, the importing or exporting can be carried out by hand. However, preferably, an import station and/or an export station according to the invention is provided with an import device or export device for automatically importing or exporting a packaging tray. This has the advantage that the importing and exporting take place in a consistent manner. In a preferred embodiment, an import device and/or export device of this type is configured for importing, in a position with a substantially horizontal orientation, the packaging trays into the tray carriers. A device of this type is particularly suitable for importing or exporting at least partially filled, open packaging trays.

Furthermore, a conveyor system according to the invention is preferably provided with import means and/or export means configured for engaging with a packaging tray in the at least one import station or a tray carrier, and exerting an importing force or an exporting force, for example a pushing force, on said packaging tray for importing said packaging tray in a controlled manner into a tray carrier which is advanced next to or above the import station, or exporting said packaging tray from said tray carrier.

A conveyor system according to the invention is preferably provided with an import station provided with an import track which extends at least partially parallel to a part of the endless conveyor track and/or which at least partially coincides with the endless conveyor track in such a way that a packaging tray in a position with a preferably substantially horizontal orientation can be imported from the import track to a tray carrier.

Figure 3:
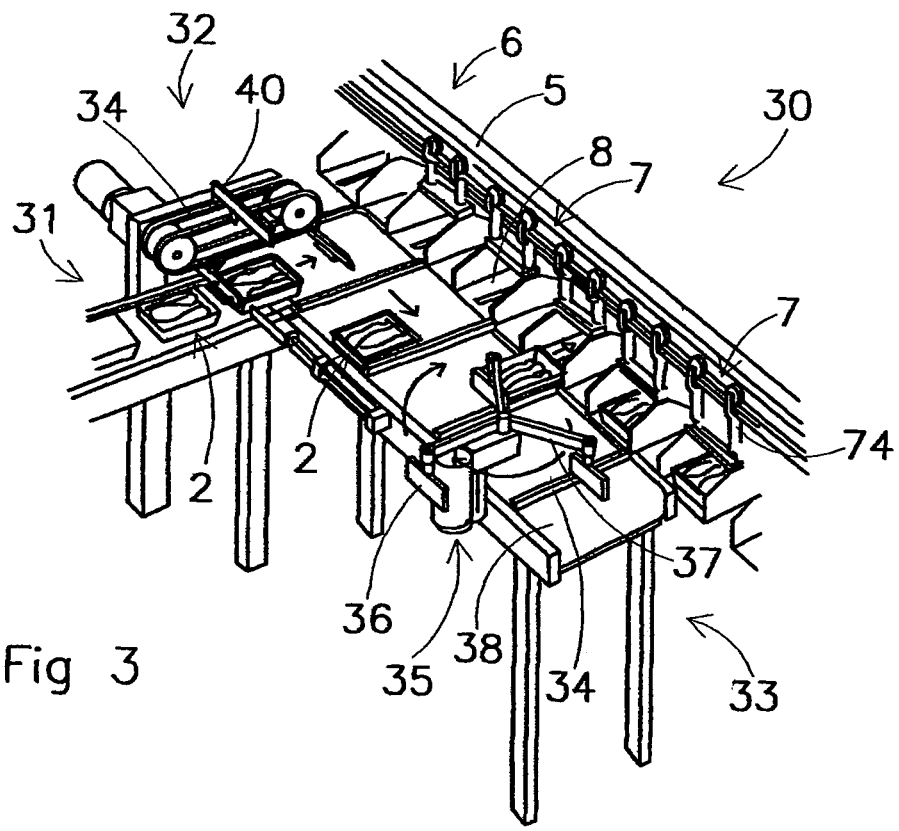
FIG. 3 shows an import station according to the invention.

FIG. 3 shows an import station 30 according to the invention, arranged next to a conveyor track 6 with a chain of tray carriers 7, which tray carriers 7 are suspendedly coupled to the rail 5 via trolleys 74. In the example shown, the import station 30 is provided with import means and the tray carriers have no import means. This has the advantage that the tray carriers can be embodied in a relatively simple and light manner.

The import station 30 comprises a buffer in the form of a supply track 31, an import track 33 arranged parallel to the conveyor track, an import means 35 for importing the packaging trays 2 from the import track 33 into the tray carriers 7 of the conveyor track 6. In the embodiment shown in FIG. 30, the import track comprises a conveyor belt; in an alternative embodiment, the import track can comprise an import platform, for example, instead of a conveyor belt.

The advantage of an import track is that the packaging trays can be slid into the tray carriers over a longer distance, and thus with gradual acceleration and deceleration in the direction transverse to the direction of conveyance of the conveyor track. This limits the forces and the accelerations exerted on the packaging tray and the contents thereof. The risk of a packaging tray becoming damaged, of products placed in the packaging tray becoming shaken up and/or being moved out of an open packaging tray, is minimal.

In the embodiment shown in FIG. 3, the supply track 31 serves as a buffer for buffering supplied packaging trays 2. At the end of the supply track 31, a selective gate 32 is provided for selectively delivering packaging trays 2 to the import track 33 in such a way that each tray is delivered to a specific tray carrier in the conveyor track.

The selective gate 32 comprises two parallel-running endless belts 39 extending in the direction parallel to the supply track 31. The belts are provided with detainers 40 extending transversely to the running direction of the endless belts. By having the belts 39 move in the running direction, the detainers 40 are moved along the bottom of the selective gate and above the supply track 31 in the direction of the import track 33. The detainers are subsequently moved in the opposite direction, along the top of the selective gate. The detainers 40 can thus be moved in a position before a packaging tray 2 on the supply track 31. When the selective gate is stopped, a packaging tray is detained by the detainer in a position on the supply track, while the supply track advances. By moving the belts of the selective gate in the running direction, the packaging tray is moved on the import track.

A selective gate is preferably activated by the control system of the conveyor system, for selectively delivering the packaging trays to the import track in such a way that each packaging tray is delivered to a specific tray carrier in the distribution system.

If, for example, the passing tray carrier is already provided with a packaging tray, the packaging trays are detained on the supply track by the selective gate. As soon as a tray carrier in which a tray can be placed comes along, the selective gate allows a packaging tray to pass from the supply track to the import track in order to be imported into said tray carrier.

An import track according to the invention is preferably configured for advancing packaging trays at a speed which is substantially equal to the speed of the conveyor track, and in line with an individual tray carrier. In an alternative embodiment, the import track is for example embodied as an import platform with a stationary, smooth surface, and the tray carriers are provided with entrainment means which engage with a packaging tray placed on the support platform in such a way that the packaging tray is subsequently advanced over the import track at a speed equal to the conveying speed. Import means of the import station or the tray carrier can then move the packaging tray into the tray carrier.

In a preferred embodiment, an import track extends, at least partially, parallel to a part of the endless conveyor track and/or at least partially coincides with the endless conveyor track in such a way that a packaging tray can be imported, in a position with a substantially horizontal orientation, from the import track to a tray carrier which is advanced, for example, next to or above the import track.

The import track 33 shown in FIG. 3 supports a packaging tray 2 on the conveyor belt positioned at a level equal to the level of a support member, in particular a platform 8, of a tray carrier 7 which is advanced next to the import track. A packaging tray on the import track is thus advanced at the same speed, at the same level with the support platform and in line with the import opening of the tray carrier. The packaging tray can be displaced in a horizontal direction from a position on the import track to a position on the support member of the tray carrier.

In the example shown in FIG. 3, the import track 33 comprises a conveyor belt 38 provided with a drive for supporting and advancing the packaging trays at a first speed. The import track 33 is also provided with, preferably elongated, positioning elements 34 extending transversely to the direction of advancement of the conveyor belt, for positioning the packaging trays in line with the tray carriers 7, in particular the import openings of the tray carriers 7, in the conveyor track 6.

In the preferred embodiment shown, the positioning elements 34 are embodied as rods which can be advanced independently of the conveyor belt 38. An embodiment of this type provides a drive for advancing the positioning elements at a second speed which is substantially equal to the speed of the tray carriers. In addition, the drive of the positioning elements is set for advancing the positioning elements in line with an import/export opening of the tray carriers moving along the import track.

Depending on the embodiment, the speed of the conveyor belt is higher or lower than the positioning elements and/or the tray carriers for positioning the packaging trays against the positioning elements. A packaging tray is placed on the conveyor belt between two positioning elements and is subsequently, if the conveyor track moves more slowly than the positioning elements, entrained by a positioning element or, if the conveyor track moves more rapidly than the positioning elements, detained by a positioning element in a position in line with the import/export opening of a tray carrier.

In the version shown in FIG. 3, the conveyor belt 38 moves at a speed which is greater than the speed of the positioning elements 34, so that a packaging tray 2 is detained by the positioning elements in a position in line with the import/export opening of the tray carrier.

Figure 19:
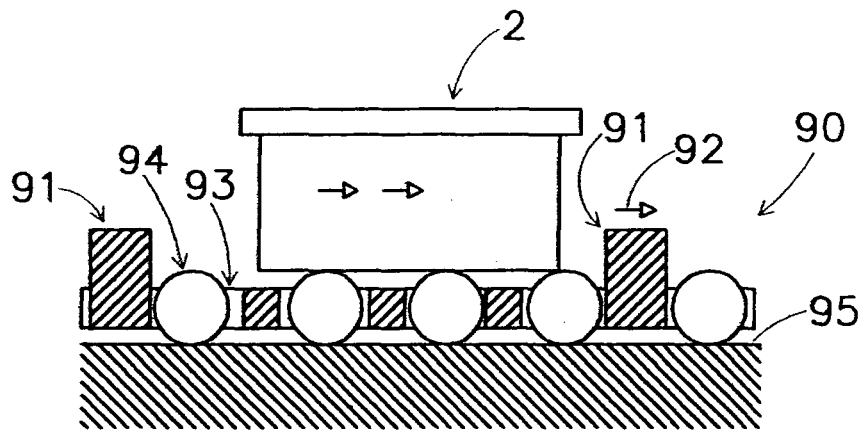
FIG. 19 is a cross section of a conveyor belt of an import station according to the invention.

In an alternative embodiment, a supply track is provided with positioning elements which advance at the same speed as the conveyor belt, are preferably connected to the conveyor belt and preferably form a single entity with the conveyor belt. FIG. 19 shows a further preferred embodiment of a conveyor belt 90, the positioning elements being embodied as positioning ribs 91 forming part of the conveyor belt. The figure shows a portion of the conveyor belt 90, in a cross section parallel to the direction of conveyance 92 of the conveyor belt. The surface of a conveyor belt of this type is provided with slots 93 with rolls 94 placed therein. The rolls 94 have a diameter larger than the thickness of the actual conveyor belt and are rotatably suspended in the slots in such a way that they protrude at the top and undersides of said conveyor belt. As a result, the conveyor belt rests, at least partially, on a bearing surface 95 via these rolls.

A packaging tray 2 placed on the conveyor belt rests on the rolls 94. When the conveyor belt 91 is advanced in the conveyance direction 92 over the bearing surface 95, the rolls rotate with respect to the conveyor belt and the packaging tray is advanced not only with respect to the bearing face but also with respect to the conveyor belt. A packaging tray placed on the conveyor belt is advanced by the rolls until the packaging tray is positioned against a positioning element.

For the sake of completeness, it should be noted that the positioning elements can extend over the entire width or merely of a portion of a conveyor belt. A positioning element can be advanced independently of a conveyor belt, can be connected to a conveyor belt or can form a single entity with a conveyor belt. A positioning element can also be made in one piece or be shaped by one or more segments which may or may not be placed at a mutual distance. A positioning element can for example consist of various pins which stick up from the conveyor belt at a mutual distance or of a beam-shaped body extending over the entire width of the conveyor belt, etc.

Figure 21:
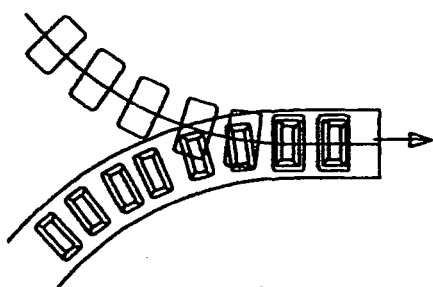
FIG. 21 shows an alternative import station provided with an import track which partially coincides with the conveyor track.

In a further alternative embodiment of an import station according to the invention, shown in FIGS. 21 and 22, an import station can comprise a supply track which partially coincides with the conveyor track and in this case passes below the support platforms of the tray carriers in the conveyor track in such a way that a packaging tray placed on the conveyor track is delivered to a tray carrier moving over the supply track.

The import track 33 of the import station shown in FIG. 3 is provided with import means for importing the packaging trays 2 into the tray carriers 7. In the embodiment shown in FIG. 3, the import means are embodied as a rotatably suspended wheel 35 with a substantially vertical axis. The wheel is provided with import members 36 and is rotated by a drive in such a way that the import members 36 move over the import track in order to push packaging trays placed on the import track into the tray carriers. The wheel is designed in such a way and is rotated at a speed such that the import members are jointly moved on the import track, at the same time as a packaging tray during the displacement of the packaging tray, in the conveyance direction and in a direction transverse to the conveyance direction.

In the preferred embodiment shown, the import members 36 are provided with a push surface for engaging with a packaging tray 2, in particular on an edge of the packaging tray. The import members 36 are connected to the spokes 37 of the wheel 35 so as to be rotatable about their vertical axis. The import members 36 are in this case rotated with respect to the spokes 37 in such a way that the push surface of the import members extends continuously in a direction perpendicular to the import direction of the packaging trays. In addition, the import members are at the same time moved in conjunction with the packaging trays in an efficient manner in the conveyance direction. In this way, during the displacement of a packaging tray, there is at all times maximum contact between the push-on surface of the import member and the packaging tray. As a result, there is little risk of the packaging tray becoming damaged during displacement.

Figure 23:
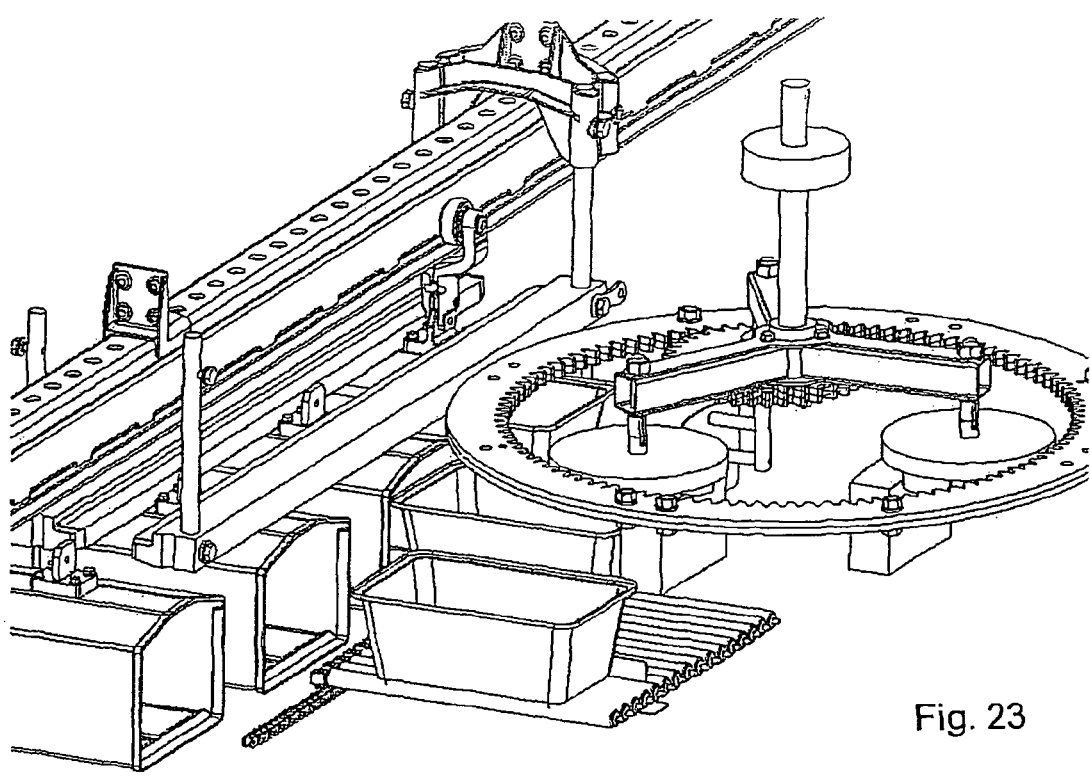
FIG. 23 shows an alternative embodiment of the import station from FIG. 3.

FIG. 23 shows a preferred embodiment of the import means from FIG. 3. The import members are advanced via a planet wheel mechanism. The three planet wheels are driven centrally and each support an import member. Because the planet wheels engage with the satellite wheel, they rotate in such a way that the import members continuously retain the correct position for displacing the packaging trays. The import members can be driven and positioned in a simple manner using a planet wheel mechanism. Furthermore, the import station shown in FIG. 23 is provided with stabilization guides for stabilizing the tray carriers during importing of the packaging trays. The stabilization guides extend on both sides of the rail of the conveyor track, at the level of the roof parts of the passing tray carriers. This prevents the tray carriers from tilting in a plane transverse to the conveyance direction during importing of the packaging trays. A stabilization guide can also form part of an import station, a treatment station, a filling station, etc. In an alternative embodiment, a stabilization guide can also provide support to other parts of a packaging tray, such as at the bottom or the side opposing the import opening. The contact surface of a guide rail can consist of a smooth surface and can be provided with rollers, a running belt, etc.

In an alternative embodiment of an import station as shown in FIG. 3, the wheel of the import means according to FIG. 3 is for example provided with cylindrical import members which are fastened to the spokes of the wheel with the axis in a vertical position. The advantage of import members of this type is that, in contrast to flat import members, no push-on surface has to be positioned at an optimum angle to the edge of the packaging tray. The import members thus do not have to be actively rotated in order to retain a correct position with respect to the packaging trays, and can be embodied and suspended in a relatively simple manner.

In a further embodiment, the import station can be provided with an import member which is moved by means of activation means over the import track transversely to the conveyance direction. The import station can for example be provided with a gas spring for displacing an import member transversely over the import track for pushing a packaging tray from a position on the import track to a position in a tray carrier positioned next to the import track.

Preferably, the activation means and the import member are movably suspended in such a way as to move in conjunction with the import track in the conveyance direction. By moving the activation means, and thus the import member, in conjunction with the import track in the conveyance direction, the packaging tray can be slid into the tray carrier in a controlled manner, that is to say at a steady uniform speed.

A further embodiment of an import station according to the invention provides import means in the form of elongated positioning elements which extend over at least a portion of the width of the conveyor belt and which are provided with import members which can move along the length of the positioning element. The import members are movably connected to the positioning elements in such a way as to be able to be moved over the surface of the conveyor belt along the longitudinal axis of the positioning element. Moving an import member along the positioning element allows a packaging tray positioned against the element to be pushed into the tray carrier.

Figure 4:
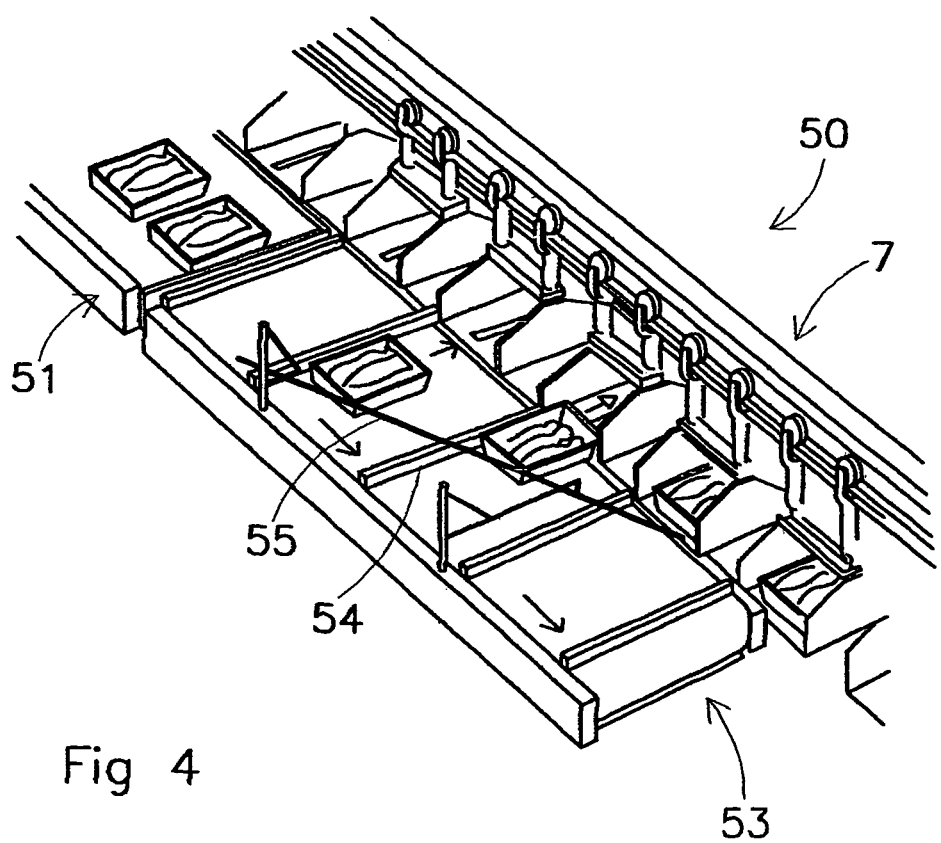
FIG. 4 shows an alternative import station according to the invention.

FIG. 4 shows a further alternative import station 50 according to the invention. Import means, in the form of a guide rail 55, are provided in this import station above an import track 53 for guiding in the tray carriers packaging trays which are advanced over the import track. The guide 55 also positions the packaging tray against a positioning element 54 running in line with the import opening of a tray carrier. An import station of this type is designed in a relatively simple manner.

The supply station shown in FIG. 4 is provided with a supply track 51 provided with a conveyor belt for buffering packaging trays and selectively supplying packaging trays to the import track 53. The supply track 51 in the example shown is provided, at the end of the conveyor belt, with a detaining member 52, which is suspended so as to be movable in the vertical direction, for selectively letting through and spacing the packaging trays supplied on the supply belt. The detaining member can be moved between a detaining position above the supply belt, shown in the figure, and a passing position below the supply belt.

Detection means (not shown), for example a sensor or camera, which signal whether a packaging tray is arranged in a buffer position at the end of the supply track, are provided for activating the detaining member. For delivering the tray to a tray carrier, the detaining member is moved to a position below the supply belt in such a way that the packaging tray is delivered to the import track before the positioning element which runs in line with the tray carrier in question. The packaging tray is subsequently positioned by the guide 55 against the positioning element 54 and then pushed along the positioning element in the direction of the tray carrier 7.

The detection means for signalling a packaging tray at the end of the supply track signal when the tray is delivered from the buffer position and when a following tray has arrived in the buffer position. The detaining member can subsequently be moved to the detaining position in order to detain the following tray in the buffer position. In this way, even packaging trays delivered in quick succession on the supply track can be spaced in such a way that they each end up before a positioning element on the import track.

It will be clear from the foregoing that packaging trays can be selectively delivered in many ways. As a further alternative, the supply belt can for example be configured for selectively delivering the packaging trays by driving and stopping the belt. For delivering the tray to a tray carrier, the supply belt is activated in such a way that the packaging tray is delivered to the import track before the positioning element which runs in line with the tray carrier in question.

In an alternative embodiment, an import station can also be formed by one or more persons placing the packaging trays in the tray carriers by hand.

Further solutions for selectively delivering packaging trays supplied via the supply track are deemed to lie within the grasp of the person skilled in the art.

A conveyor system according to the invention is preferably provided with one or more export stations comprising an export device for exporting, preferably in a position with a substantially horizontal orientation, the packaging trays from the tray carriers.

The conveyor system is thus suitable for conveying open packaging trays in a simple manner and distributing these packaging trays over a plurality of export stations, for example over a plurality of packaging devices.

An export station of this type is preferably provided with export means configured for engaging with a packaging tray supported by a support member of a tray carrier and for exerting an exporting force, for example a pushing force, on said packaging tray for exporting said packaging tray in a controlled manner from the carrier at an export station.

In a preferred embodiment, the export means form part of an export station in such a way that the tray carriers do not have any export means. In a conveyor system of this type, the tray carriers can be embodied in a simple and light manner.

Figure 20:
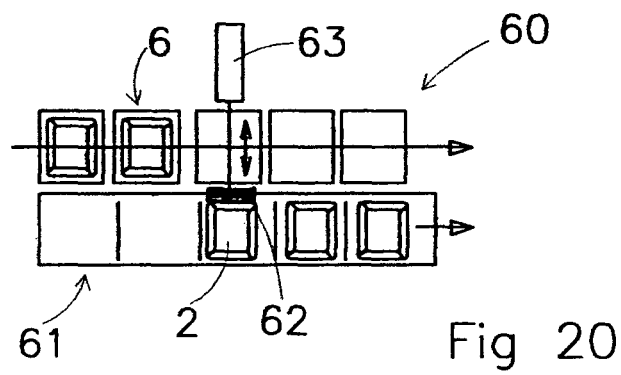
FIG. 20 shows an export station provided with pneumatic export means.

FIG. 20 shows an example of an export station 60 comprising an export track 61 and export means in the form of an export member 62 which is moved transversely to the direction of conveyance of the conveyor track 6 by means of activation means 63. In the example shown, the export station 60 is provided with a gas spring 63 for displacing an export member over the support platform 8 of a tray carrier 7, for pushing a packaging tray 2 out of the tray carrier on an export track. In a further embodiment, a plurality of export members suspended in parallel can be provided for simultaneously or successively pushing packaging trays out of the tray carriers.

Preferably, the activation means and the export member are movably suspended in such a way that they move in conjunction with the tray carrier in the conveyance direction during the pushing of the packaging tray out of the tray carrier. By moving the activation means, and thus the export member, in conjunction with the export track in the conveyance direction, the packaging tray can be slid out of the tray carrier in a controlled manner, that is to say at a steady uniform speed.

In an alternative embodiment, the export means wholly or partially form part of the tray carriers. In a preferred embodiment, the tray carriers are provided with export members for moving the packaging trays out of the tray carriers and the export stations are provided with activation means for activating the export members.

Figure 30:
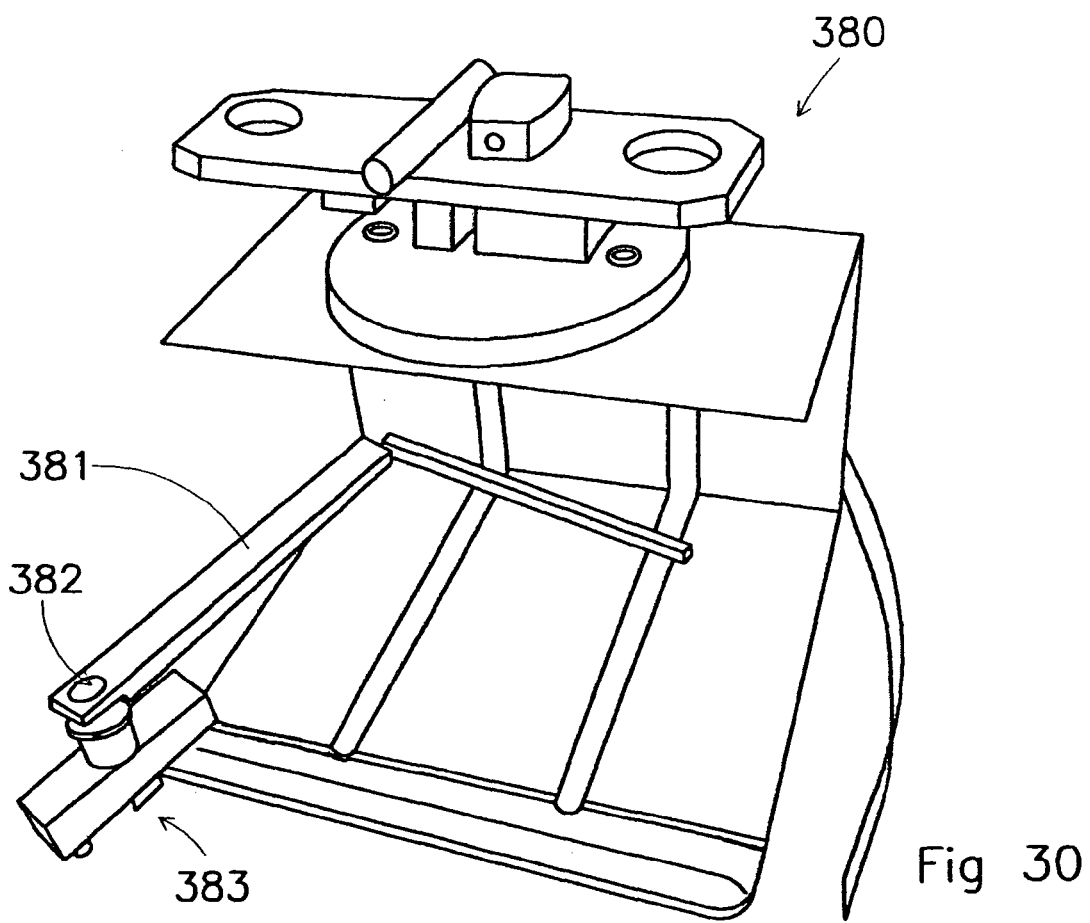
FIG. 30 is a perspective view of a further alternative tray carrier according to the invention.

FIG. 30 shows a tray carrier 380 provided with export means in the form of an L-shaped push-out arm 381 which can move over the support platform. The arm 381 is hingeably suspended about a vertical shaft 382 and is movable between an accommodating position, shown in the figure, and an ejecting position.

The hinge shaft 382 is provided at an underside with activation means in the form of a block 383 which is provided at the underside with cams (not shown in the figure) for engaging with a cam track of an export station. In this way, the push-out arm 381 can be activated by an export station for pushing a packaging tray out of the tray carrier.

After the tray carrier has passed the export station, or before the tray carrier has passed an import station, the arm can be turned back to an accommodating position with the aid of a cam track, so that a packaging tray can be slid into the tray carrier. An export arm of this type is simple to embody and as a result has low susceptibility to malfunctions. In an alternative embodiment, the export arm can also be activated with the aid of other means, for example with the aid of a drive forming part of the tray carrier.

An export device according to the invention is preferably provided with an export track, for example a conveyor belt or an export platform. An export track of this type extends at least partially parallel to a part of the endless conveyor track and/or at least partially coincides with the endless conveyor track in such a way that a packaging tray can be exported, in a substantially horizontal direction, preferably in a position with a substantially horizontal orientation, to the export track from a tray carrier which is advanced next to or above the export track.

In a preferred embodiment, the export track is at least partially positioned at a level which is substantially equal to the level of the support member of a tray carrier which is advanced next to the export track in such a way that a packaging tray can be displaced in a substantially horizontal direction from a position on the support member of said tray carrier to a position on the export track.

In an alternative embodiment, the export track extends at least partially at a level lower than the level of the support member of a tray carrier which is advanced above the export track in such a way that at least a part of the export track coincides with the conveyor track. The support member of the tray carriers in a conveyor system of this type is configured for supporting a packaging tray below a part of the packaging tray positioned above the bottom of the packaging tray, that is to say a part of the packaging tray set apart somewhat from the export track on which the packaging tray rests. Preferably, the tray carrier supports a part of the underside of a flange along the opening of the packaging tray. In a conveyor system of this type, the export track extends at least partially at a level substantially equal to the level of the bottom of the packaging tray which is supported by the support member of the tray carrier, in such a way that a packaging tray can be displaced in a substantially horizontal direction from a position on the support member of said tray carrier to a position on the export track.

Figure 5:
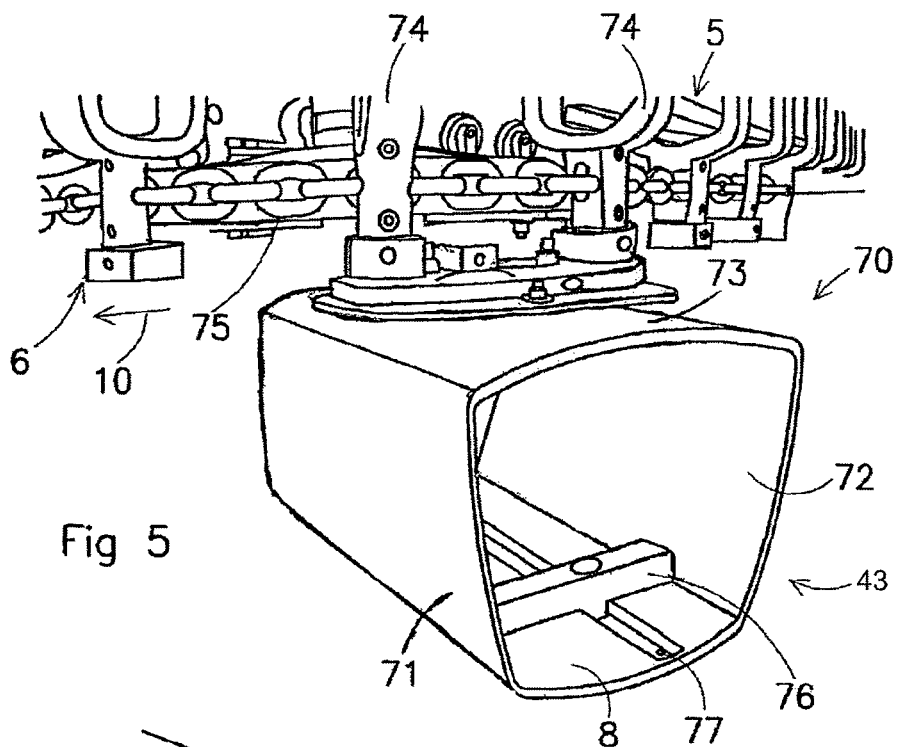
FIG. 5 shows a tray carrier according to the invention.

FIG. 5 shows an exemplary embodiment of a tray carrier 70 according to the invention. The tray carrier is configured for conveying a packaging tray along the conveyor track 6, the packaging trays being conveyed along the bottom side of the rail 5 in a conveyance direction 10.

The tray carrier 70 shown in FIG. 5 is provided with a support platform 8 with a fixed horizontal orientation for conveying a packaging tray in a position with a horizontal orientation.

Preferably, a tray carrier according to the invention is provided with at least one side wall and optionally an upper wall for protecting a packaging tray and/or the contents thereof from environmental influences. In a further preferred embodiment, the side walls extend up to the side of the tray carrier, such that the edges of the wall define the import/export opening. The tray carrier 70 is provided at two oppositely positioned ends with an import/export opening 43. A front wall part 71, which is positioned upstream with respect to the conveyance direction, and a rear wall part 72, which is positioned downstream with respect to the conveyance direction, are provided along the two sides of the support platform that are positioned between the import/export openings. The wall parts positioned opposite each other are connected via a roof part 73. The roof part is suspended from the rail 5 of the conveyor belt 6 via two trolleys 74. In an alternative embodiment, a tray carrier can be connected to the rail via just one trolley or via more than two trolleys.

The trolleys 74 are connected via a chain 75 to the trolleys of the two adjacent tray carriers (not shown) which are, in turn, connected to the trolleys of the adjacently positioned tray carriers, etc., in such a way that the various tray carriers form an endless chain.

The tray carrier shown in FIG. 5 comprises two side walls 71, 72 protecting a packaging tray placed on the bearing surface 8. This has the advantage that when, for example, a treatment takes place on a tray placed in the tray carrier and/or the contents thereof, for example marinating meat products in a tray with a marinade shower, a packaging tray in an adjacent tray carrier is not influenced, for example by splashes of marinade.

Preferably, a tray carrier according to the invention is embodied in such a way that the packaging tray placed in the tray carrier and/or the contents thereof is accessible from outside the tray carrier to treatment means for carrying out treatments on the tray and/or the food products in the tray, such as adding an additive. For example, the tray carrier can be provided with a relatively large import/export opening.

Figure 9:
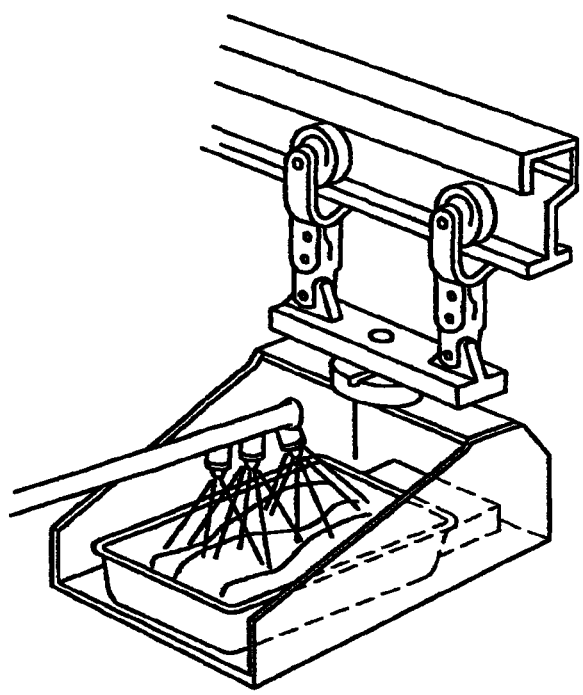
FIG. 9 shows a tray carrier according to the invention in an in-line treatment station according to the invention.

FIG. 9 shows an alternative in which a tray carrier is configured to support a packaging tray not right below the rail, but next to the rail. As a result, the contents of the packaging tray are easily accessible from above to, for example, an arm of a marinade shower for marinating meat products placed in the packaging tray. In a tray carrier of this type, other food products or for example a packet of sauce can, for example, also easily be placed in the packaging tray.

Figure 26:
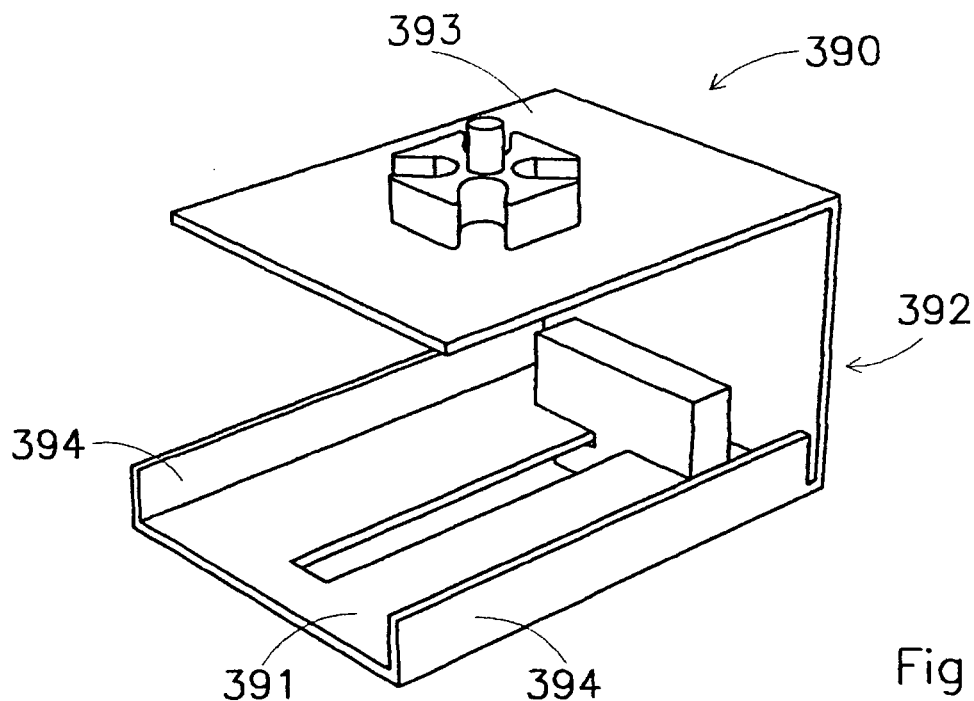
FIG. 26 is a perspective view of a further alternative tray carrier according to the invention that is provided with a turning element for rotating the tray carrier about a vertical axis.

FIG. 26 shows a further embodiment of a tray carrier 390 according to the invention, the support platform 391 being connected to a roof part 393 via merely a rear wall 392. The support platform 391 is also provided with two upright edges 394 for guiding a packaging tray when the packaging tray is imported or exported. In a tray carrier of this type, the packaging tray and/or any contents of said packaging tray are easily accessible from three sides for treatments.

When a chain of tray carriers of this type is conveyed with the wall parallel to the conveyance direction, the spray head of a marinade shower can for example be positioned in a fixed position in the conveyor track for providing the contents of the packaging tray with a layer of marinade.

The tray carrier shown in FIG. 5 is configured for accommodating and delivering packaging trays in a substantially sideways direction with respect to the direction of advancement 10 of the conveyor track 6. In addition, a packaging tray can be imported from both sides of the conveyor track. For this purpose, the tray carrier is provided at two ends with import/export openings for importing and exporting packaging trays. This has the advantage that import and export stations can be placed in the conveyor system on both sides of the conveyor track.

In an alternative embodiment, the tray carrier can be provided with one or more import openings at a side of the tray carrier. In addition, a tray carrier can be suspended from the conveyor track so as to be rotatable about its vertical axis, in such a way that an import/export opening can be displaced from, for example, one side of the conveyor track to the opposite side of the conveyor track.

The support platform 8 of the tray carrier 70 shown in FIG. 5 extends up to the side of the tray carrier. A packaging tray can be slid into or slid out of the tray carrier in a position with a horizontal orientation, for example from or to a support platform which forms part of an import or an export station respectively and which is positioned at the same height as the support platform of the tray carrier.

In an alternative embodiment, the bearing surface of the tray carrier is provided with a small sill along the at least one import/export opening in order to prevent a packaging tray placed on the support surface from accidentally sliding out of the import/export opening during conveyance, for example as a consequence of vibrations of the tray carrier. The support platform and sill preferably merge with each other gradually so that a packaging tray can easily be pushed over the sill with the aid of imports means and export means.

In a further alternative embodiment, the support platform is placed at an angle in such a way that, in order to move a packaging tray out of the tray carrier, the tray carrier has to be pushed up somewhat at an inclination. The angle of the support platform to the horizontal is preferably between 5 and 10 degrees, and is preferably 5 degrees, so that, on the one hand, the inclination is sufficiently oblique to prevent the packaging tray from vibrating out of the tray carrier and, on the other hand, the packaging tray is positioned substantially horizontally so that food products placed in an open packaging tray do not vibrate out of said tray during conveyance.

In a further embodiment, a carrier according to the invention is provided with a support platform which can be tilted between a position with a horizontal orientation and a position with a tilted orientation. The support platform of a carrier of this type can be positioned horizontally for importing and exporting a packaging tray and be placed at an angle for conveying a packaging tray. The support platform is provided, at the side positioned opposite the import opening, with an upright wall preferably forming part of the tilting platform, against which a packaging tray can rest during conveyance.

A support platform of this type can be tilted between a position with a horizontal orientation and a position with a tilted orientation, preferably at an angle between 5 and 10 degrees, preferably 5 degrees, to the horizontal orientation. At an angle of this type, the risk of the contents falling out of the tray is limited.

Figure 31:
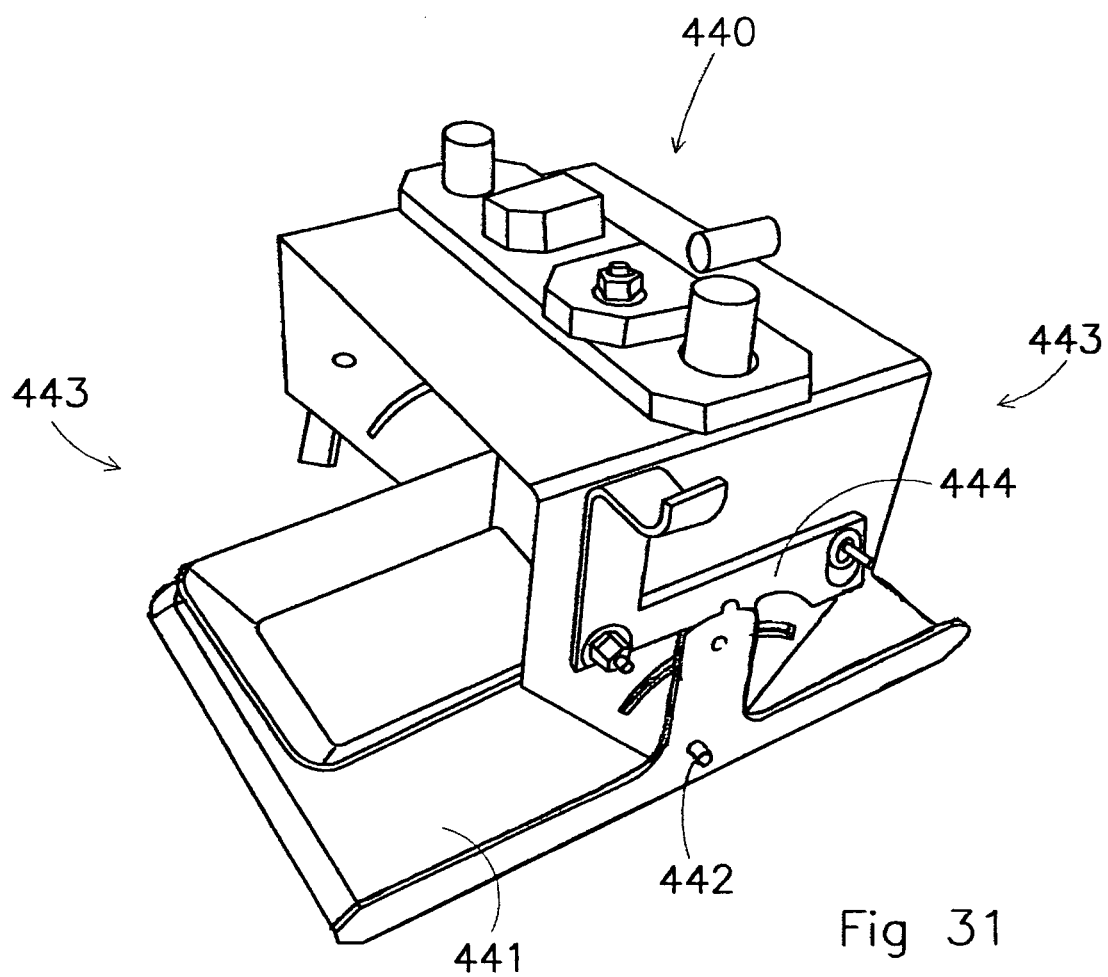
FIG. 31 is a perspective view of a further alternative tray carrier according to the invention.

FIG. 31 shows an alternative tray carrier 440 provided with a support platform 441 which is tiltable over an angle greater than 10 degrees. In the example shown, the tray carrier 440 is provided with a support platform 441 with an import/export opening 443 on either side. The support platform 401 is tiltable toward two edges about a shaft 442 transverse to the import/export direction. A lock 444 for operating the tiltable platform is provided at the side of the tray carrier 440.

A tray carrier of this type is suitable for conveying open packaging trays when the support platform is positioned in the horizontal position. In addition, the tray carrier is particularly suitable for conveying empty packaging trays and packaging trays sealed with a film. Packaging trays of this type can be exported by tilting the platform in such a way that the packaging tray slides from the support platform.

In a tray carrier according to the invention, the controlled export, the export means exerting a pushing force on the packaging tray, also allows the support platform to be provided with a rough surface in order to prevent the packaging tray from accidentally sliding off the support platform, for example under the influence of vibrations of the trolley during conveyance. The frictional force between the support platform is in this case sufficiently high to prevent displacement of the packaging tray as a consequence of vibrations, but low enough to allow the export means to push the packaging tray from the platform.

In an alternative embodiment, the tray carrier can be provided with one or more support platforms, for example at various heights, which are each suitable for supporting one or more packaging trays. For example, the size of the support platform can be sufficiently large to support a packaging tray imported via a first import/export opening in addition to a packaging tray imported through the opposite import/export opening.

Figure 14:
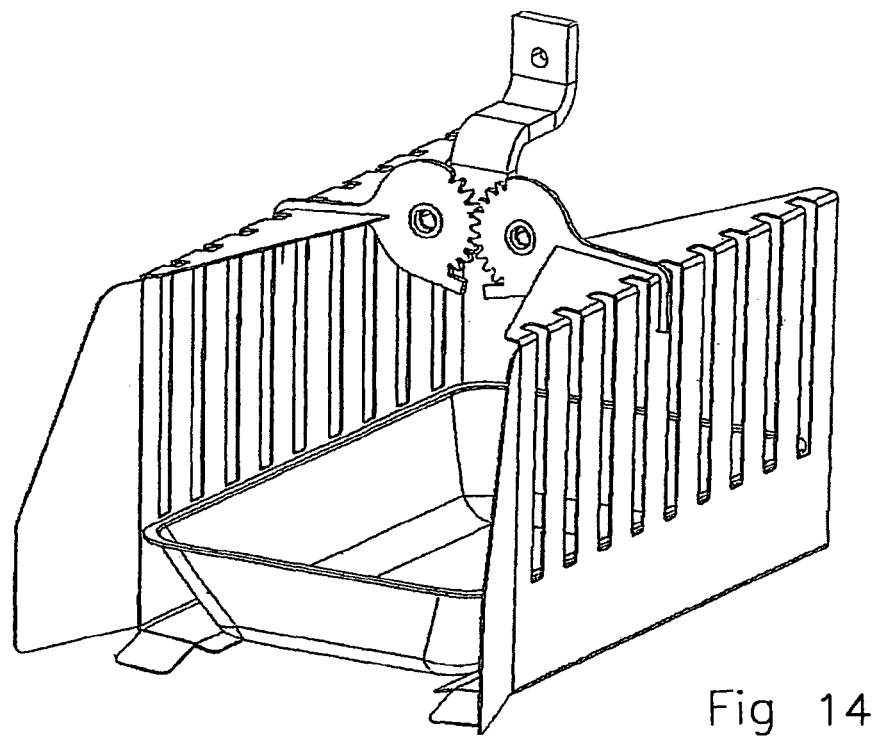
FIG. 14 shows a further alternative tray carrier according to the invention.
Figure 15:
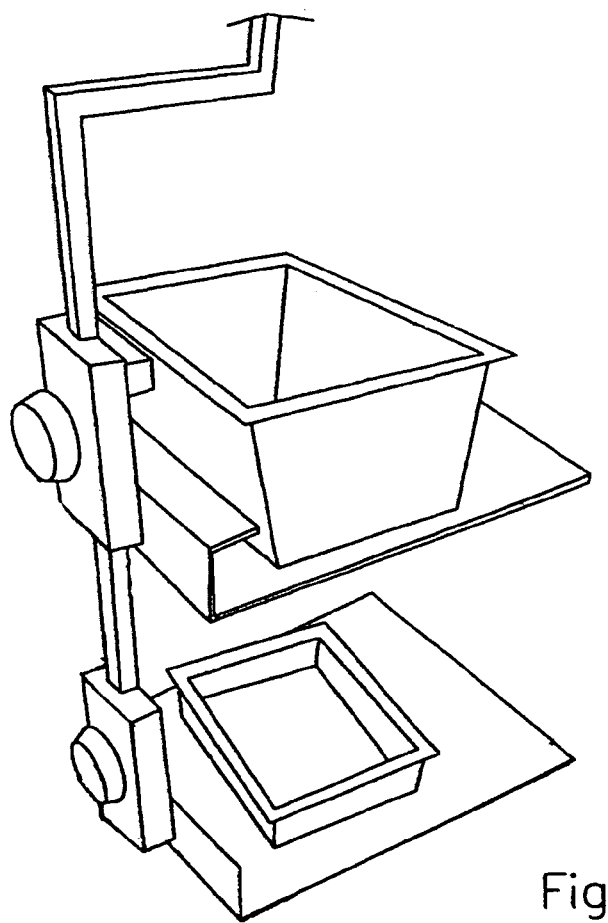
FIG. 15 shows a further alternative tray carrier according to the invention.

In an alternative embodiment, a plurality of support platforms can be provided. For example, two or more support platforms can be attached one above the other so that packaging trays can be imported into and exported out of the tray carrier at various heights. A tray carrier of this type is shown in FIG. 14. It is for example also possible to provide a plurality of support platforms which are each movable in the vertical direction with respect to an import/export opening, so that a plurality of packaging trays can be imported into the tray carrier from import stations each delivering packaging trays at the same delivery height.

In a further embodiment, a tray carrier can be provided with one or more support platforms, which are displaceable in the vertical direction, for interaction with delivery stations configured to feed out of the conveyor track only the packaging trays which are conveyed at a specific export height.

For example, FIGS. 17 and 18 show a tray carrier 170 provided with a support platform 178 which is movable in the vertical direction between a first position, shown in FIG. 17, and a second position, shown in FIG. 18. In the first position, the support platform 178 engages with a packaging tray 2 positioned on an import platform 179. In the second position, the support platform passes the import platform, and optionally a packaging tray placed on the import platform, along the top.

The tray carrier 170 is connected, so as to be movable in the vertical direction, to the trolley 174 which is, in turn, suspended from the conveyor track (not shown in the figure) for advancing the tray carrier in the conveyance direction 10. The tray carrier 170 is provided with a cam for interaction with guide rails 171, 172 extending at least at the height of the import station along the conveyor track. The conveyor system, preferably the import station, is provided with a guide system (not shown) for moving the cam of a tray carrier in the first guide rail 171 or second guide rail 172 when the tray carrier approaches the import platform.

The exemplary embodiment shown in FIGS. 17 and 18 of a tray carrier 170 comprises a support platform 178 embodied as a fork with a plurality of prongs for partially supporting a packaging tray 2 and for interacting with a likewise fork-shaped import platform 178. The teeth of the tray carrier and the import platform extend parallel to the direction of advancement of the tray carrier and are positioned in such a way as to move along one another as the tray carrier passes by the import platform. This allows the teeth of the tray carrier to move in a simple manner below a packaging tray placed on the import platform.

The tray carrier shown in FIGS. 17 and 18 is suspended in such a way that the tips of the teeth of the support platform are directed in the conveyance direction for picking up a packaging tray on an import platform.

As in the import station, the carrier can for example also pass the export station in a first and in a second position. In that case, the packaging tray is exported from the carrier when the carrier passes the export station in the first position, whereas the packaging tray remains in the tray carrier when the tray carrier passes the export station in the second position. For exporting the packaging tray, an export station can for example be provided with export means in the form of a guide rail which pushes the tray away from the support platform.

Turning the tray carrier, as shown in FIGS. 17 and 18, over an angle of 180 degrees with respect to the conveyance direction allows the fork-shaped support platform to interact with a fork-shaped export platform for exporting a tray carrier. In a preferred embodiment, the tray carrier is suspended from the trolley in such a way that the tray carrier can be rotated about its vertical axis over an angle of at least 180 degrees in such a way that the tips of the fork can be moved from a position in which they are directed in the conveyance direction for picking up a packaging tray to a position in which they are directed in the opposite direction for delivering a packaging tray to a fork-shaped export platform. The teeth of the tray carrier and an export platform of this type extend parallel to the direction of advancement of the tray carrier and are positioned in such a way as to move along one another as the tray carrier passes by the export platform.

Furthermore, the teeth extend from a level somewhat below the level of the support member of the tray carrier to a level somewhat above the level of the support member of the tray carrier in such a way that when the tray carrier passes the export platform, the export platform engages with the packaging tray on the support member of said tray carrier and takes over the supporting of the packaging tray from the support platform. This allows the teeth of the export platform to move in a simple manner below a packaging tray placed on the support platform.

Preferably, the tray carrier, in particular the support surface, is hingably suspended for hinging about a hinge shaft extending transversely to the prongs of the fork. In a tray carrier of this type, the fork-shaped support surface can be tilted somewhat in such a way that, during passing of an import station or an export station, a portion of the teeth, in particular the tips, extends below the teeth of an import station or export station, while some of the shanks extend above the teeth of the import station or export station. In this position, the picking-up and delivering of a packaging tray to a fork-shaped import platform or a fork-shaped export platform respectively is facilitated.

In a further embodiment, a fork-shaped import platform or export platform can be suspended so as to be vertically movable. For example, by moving, at the moment when a tray carrier passes an export platform of this type, from a position below the support platform to a position above the support platform, it can take over the supporting of a packaging tray from the support platform of the tray carrier.

In a further embodiment, a fork-shaped support platform can for example be embodied as a fork with two prongs. Preferably, the support platform, formed by the prongs of the fork, is configured by a tray carrier of this type for supporting a packaging tray below a part of the packaging tray positioned above the bottom of the packaging tray, for example the flange for fastening to a sealing film. This flange extends along the opening of the packaging tray. In a tray carrier of this type, the surface of the support platform can be embodied in a minimal manner, so the tray carrier remains relatively light.

An export station for exporting a packaging tray from a tray carrier of this type is preferably provided with an import track which at least partially extends at a level substantially equal to the level of the bottom of the packaging tray which is supported by the support member of the tray carrier. The packaging tray can be exported in a substantially horizontal direction via an export station of this type.

In an alternative embodiment, the tray carrier can be provided with a support platform which merely partially supports the bottom of a packaging tray. When a packaging tray is placed on a support platform of this type, the bottom is preferably supported just along the edges, while the middle part of the bottom of the packaging tray placed in the tray carrier is not supported. This has the advantage that the middle part of the bottom of the packaging tray remains accessible from below to means for moving the packaging tray into or out of the tray carrier. It is, for example, also possible for an export means forming part of an export station, for example a hook-shaped export member, to easily engage from below with the packaging tray in order to push the packaging tray from the support platform.

Figure 27:
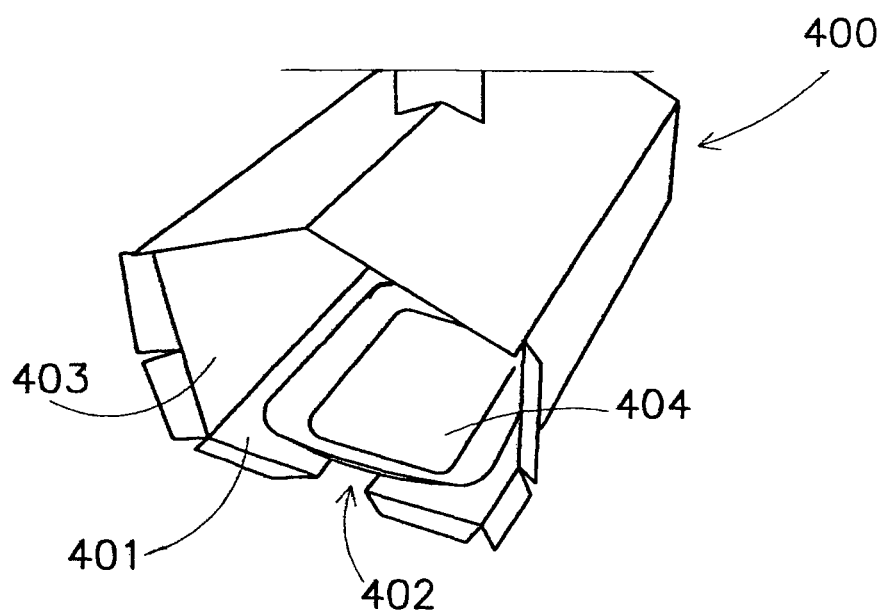
FIG. 27 is a perspective view of a further alternative tray carrier according to the invention.

FIG. 27 shows a tray carrier 400, the support platform 401 being provided with a slotted opening 402 extending in the import/export device from an import/export opening 403 to an opening at the back of the tray carrier (not shown). A packaging tray 404 in the tray carrier 400 can easily be moved out of the tray carrier by moving a pin through the tray carrier via the slot 402. A pin of this type can form part of the export means of an export station, for example.

In a preferred embodiment, a pin of this type is combined with an export member in a T-shaped configuration, the export member extending transversely to the export direction. An export member of this type engages with the packaging tray over a relatively large surface area compared to an I-shaped pin, so there is little risk of damage to the packaging tray.

In a further preferred embodiment, the pin is movably suspended in such a way that the pin is movable both in the export direction and in the direction of conveyance of a tray carrier. A pin of this type can be moved, during exporting of a packaging tray, in conjunction with the tray carrier in the conveyance direction so that the packaging tray can be exported over a longer period of time, and thus with low acceleration/deceleration, and therefore with less risk of damage to the packaging tray without the tray carrier having to be stopped.

The tray carrier 70 shown in FIG. 5 is provided with export means for pushing a packaging tray out of the tray carrier. In the exemplary embodiment shown, export means comprising a displaceable, beam-shaped export member 76 are provided. The export member 76 is movably placed in a guide slot 77 extending, transversely to the conveyance direction, in the support platform. The export member can be moved between a position in the first import/export opening of the tray carrier and a position in the opposite import/export opening.

Depending on the position of the export member 76, one import/export opening of the tray carrier is released for importing packaging trays while the other import/export opening is blocked. The export member in this way also functions as a stop which prevents all or part of a packaging tray being pushed, during importing thereof, out of the tray carrier through the opposite opening.

Figure 6:
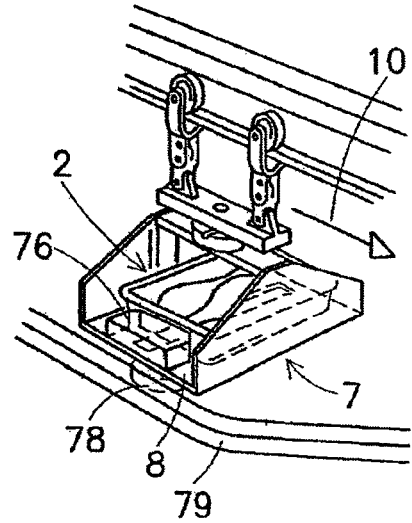
FIG. 6 shows a tray carrier and an export station according to the invention in a first operating position.
Figure 7:
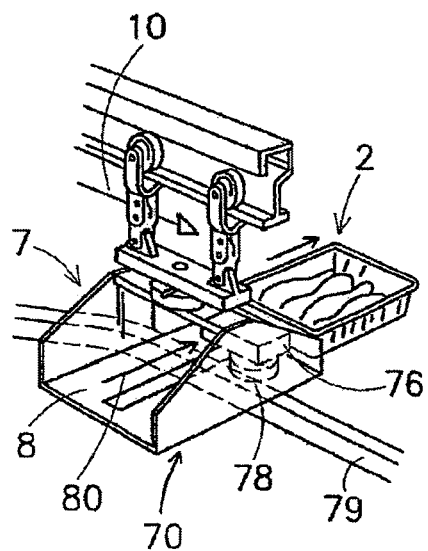
FIG. 7 shows the tray carrier and the export station from FIG. 6 in a second operating position.

The ejector 76 of the tray carrier shown in FIG. 5 is provided, at the underside of the tray carrier 7, with engagement means configured for interaction with activation means of an export station, and the operating principle of which is shown in FIGS. 5, 6 and 7. In this specific example, the engagement means are formed by the engagement wheel 78 which is connected to the guide member 76 via a pin. The activation means are formed by a guide rail 79.

The guide rail 79 forms part of an export station and extends substantially along the conveyor track, in particular along the track of the tray carrier. The guide rail 79 is provided with a curvature for guiding, via the engagement wheel, the ejector 76 from one end of the tray carrier 7 to the opposite end of the tray carrier.

When the tray carrier 7 is advanced along the guide rail 79 in the conveyance direction, the engagement wheel 78 engages with the guide rail, as shown in FIG. 6.

As the tray carrier 7 advances along the guide 79, the gripping wheel 78 is moved by the guide from a first position at one end of the tray carrier to a position at the other end of the tray carrier, such as is shown in FIG. 7. As a result of the displacement of the engagement wheel, the export member 76 is displaced over the bearing surface 8 in an export direction, indicated by an arrow 80, and pushes in the process the packaging tray 2, which is placed on the bearing surface, out of the tray carrier 7 onto a support platform of the export station (shown in FIG. 8).

Figure 8:
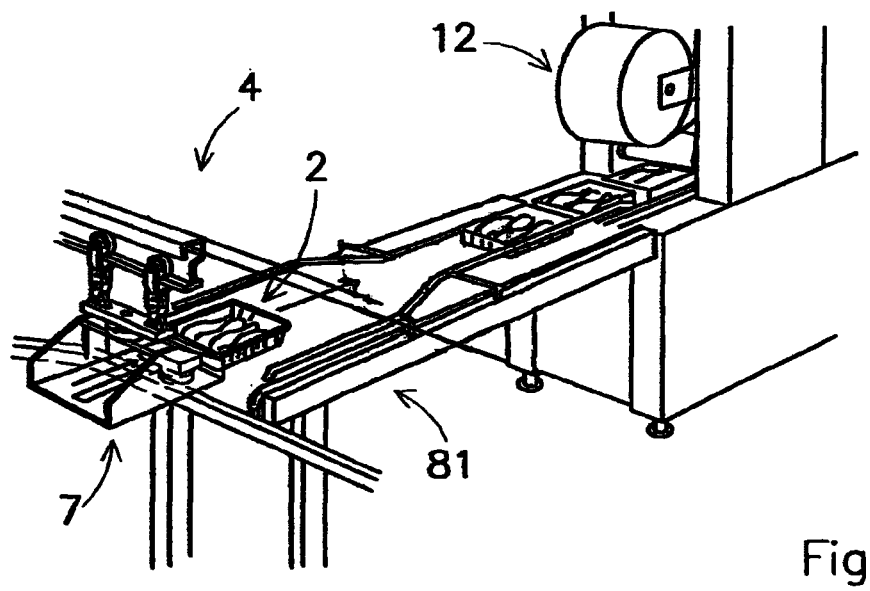
FIG. 8 shows the tray carrier and the export station from FIG. 6 in a third operating position.

FIG. 8 shows the export station 4 comprising a packaging device 12 for sealing packaging trays with a film. The export station 4 also comprises a support platform 81 in the form of a running belt. A packaging tray 2 is pushed out of the tray carrier 7 onto the running belt which conveys the packaging tray in the direction of the packaging device 12. An export station can for example be provided with scanners or other detection means which pass on the position of the tray to the control system of the conveyor system.

In the exemplary embodiment shown in FIGS. 5-7, the guide 79 is for example movably suspended in such a way as to be able to be moved in the vertical direction into and out of the track of an engagement wheel of a passing tray carrier. The activation means for activating the export means are preferably activated by the control system of the conveyor system. The control system is preferably provided with positioning means which can move the position of a guide, for example, into the track of an engagement wheel in order to push a packaging tray out of a passing tray carrier and can move out of the track of an engagement wheel in order to convey the packaging tray onward along the conveyor track.

In an alternative embodiment, a guide rail can for example also be embodied as a switch which, in a first position, allows a tray carrier to pass unimpeded and, in a second position, engages with the export means of the tray carrier in order to activate the export means and to export the packaging tray.

A conveyor system according to the invention can also be provided with activation means for positioning in a desired position the export means forming part of the tray carrier, in particular an export member. Activation means, which move the export members of the passing tray carriers in a position such that the import/export opening, which is turned toward the import station, is released for importing packaging trays, can be provided upstream with respect to an import station, for example.

The tray carrier shown in FIGS. 5-7 is provided with export means in the form of a displaceably suspended export member which is moved by activation means outside the tray carrier, for example a guide rail of an export station. In an alternative embodiment, the tray carrier itself can be provided with means for activating the export members, for example in the form of a drive or a piston, which are configured to move an export member between one end and the opposite end of the tray carrier.

A conveyor system can for example be provided with switching stations along the conveyor track for selectively switching on the activation means of passing tray carriers. Switching stations of this type can form part of an export station for selectively exporting the trays.

In an alternative embodiment, the export means can also fully form part of an export station or a treatment station. For example, an export station can be provided with movable hooks or push-out bodies configured to engage with a packaging tray placed in a tray carrier in order to push or to pull the packaging tray out of the tray carrier onto a bearing surface of the export station.

FIG. 20 is for example a schematic plan view of an export station with export means in the form of an export member and a pneumatic cylinder. In a preferred embodiment, the export means of an export station are embodied so as to be able to jointly move along the conveyor track and can in this way push the packaging trays out of the tray carriers at a uniform speed.

Furthermore, a tray carrier according to the invention can be provided with a movable bearing surface for moving a packaging tray at least partially out of the tray carrier. For example, the bearing surface can be translatably suspended for moving a packaging tray substantially transversely to the conveyance direction and out of the tray carrier. In the slid-in state, the tray carrier can convey the packaging tray in a compact state along the conveyor track. In the slid-out state, the packaging tray can be provided at export stations and/or treatment stations arranged along the conveyor track.

The support platform can also be provided with drivable rolls extending transversely to the import/export direction for movably supporting a packaging tray in the tray carrier. A packaging tray can be moved into or out of the tray carrier by turning the rolls into one direction or the other. The rolls are preferably driven by a drive forming part of the tray carrier.

The support platform can also be embodied as a conveyor belt extending substantially transversely to the conveyance direction for importing and exporting a packaging tray. A conveyor belt of this type can for example be provided with a drive configured for selectively driving the conveyor belt. In an alternative embodiment, the conveyor belt can also extend along the bottom side of the tray carrier and thus be accessible to activation means forming part of an export station, for example. Preferably, the surface of a conveyor belt of this type is provided with engagement means, preferably ribs or perforations, for interaction with the external activation means.

A tray carrier as shown in FIGS. 5-8 has an export member which blocks an import/export opening at all times. The packaging trays have to be exported through the opening through which they are imported. In an alternative embodiment of a tray carrier according to the invention, the tray carrier is provided with export means in the form of an export member which is movably suspended so as to be able to be moved away out of the track of a tray carrier. The export member is for example displaceable between an active position above the support platform, for pushing a packaging tray from the support platform, and an inactive position below the support platform.

For example, the export member can be suspended so as to be able to be moved away in the vertical direction to a position below the bearing surface in order to release the import/export opening. When the packaging tray is slid into the tray carrier, the export member can be moved back to the position above the bearing surface for blocking and/or pushing out the packaging tray.

In a further embodiment, the export member can at the base be hingingly suspended in such a way that the block can be rotated between a position with a substantially vertical orientation for blocking an import/export opening and pushing out a packaging tray and a position with a substantially horizontal orientation for releasing an import/export opening.

Figure 12:
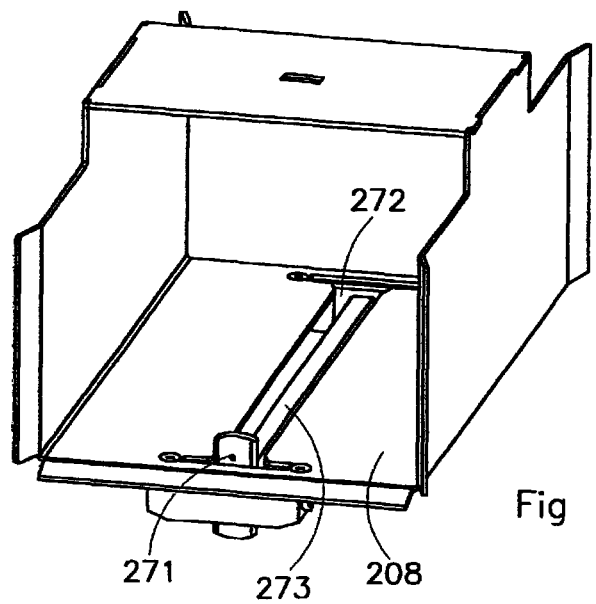
FIG. 12 shows an alternative tray carrier according to the invention.
Figure 13:
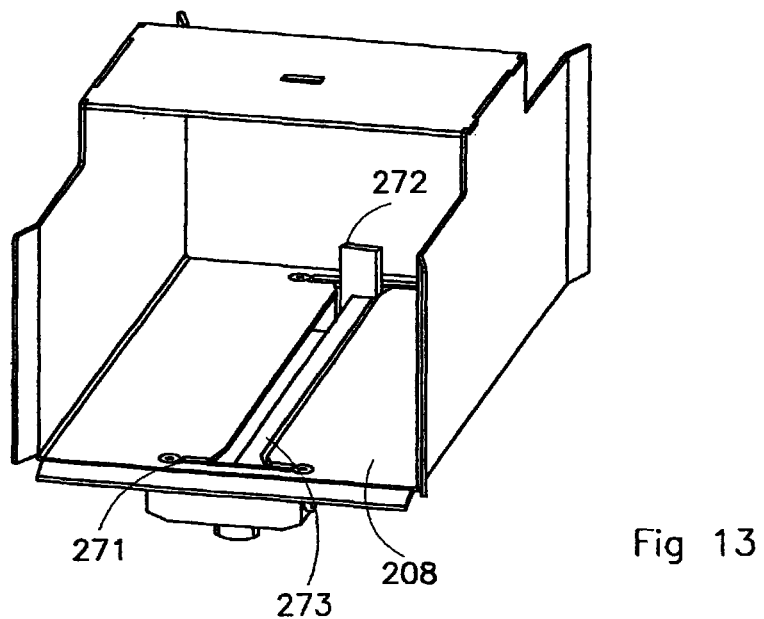
FIG. 13 is a second view of the tray carrier from FIG. 11.

In a preferred embodiment, the tray carrier 270 is provided with export means as shown in FIGS. 12 and 13, the tray carrier comprising two export members 271, 272 which can each be rotated between an active position and an inactive position.

In the active position, the export member is positioned above the bearing surface 208 for blocking an import/export opening and/or pushing a packaging tray out of a tray carrier. In the passive position, the export member is positioned in a position out of the track of the bearing surface, for example to a position below the bearing surface, for releasing an import/export opening. FIG. 12 shows the tray carrier 270 with the first export member 271 in the active position and the second export member 272 in the inactive position. FIG. 13 shows the tray carrier with the first export member 271 positioned in the inactive position and the second export member 272 positioned in the active position.

In the embodiment shown, the tray carrier is provided with a guide rail 273 which is rotatable about its longitudinal axis. The guide rail 273 is suspended below a slot 274 in the bearing surface 208 and extends from one import/export opening to the opposite import/export opening. The guide rail 273 supports the two export members 271, 272 in such a way that the export members are displaceable along the guide rail, through the slot 274 in the bearing surface 208. The export members are attached in a form-fitting manner around the guide rail; in the example shown, the guide rail and the opening in the export member are both provided with a square cross section, so that the export member moves in conjunction with the guide rail when the guide rail is rotated about the longitudinal axis. In an alternative embodiment, the guide rail and the opening can for example be provided with a rectangular, triangular, hexagonal or oval cross section.

The export members 271, 272 are both elongated in shape and attached, viewed in a direction parallel to the longitudinal axis of the guide rail 273, in a staggered manner with respect to each other.

When an export member extends in a substantially vertical direction above the bearing surface, for blocking an import/export opening and/or pushing a packaging tray out of the carrier, then the export member positioned opposite extends in a substantially horizontal direction, below the bearing surface, for releasing an import/export opening.

When an export member is positioned in a substantially vertical direction, it also extends from above the support platform to below the tray carrier. The downwardly directed end of the export member is thus accessible to activation means such as a cam track, for example, of an export station, for example, for displacing the export member through the slot.

In an alternative embodiment, it is for example possible to provide, instead of a rotatable guide rail with two export members, two parallel rotatable guide rails each having an export member, so that both export members can be positioned independently of each other in an active or inactive position. In an embodiment of this type, both mutually opposing import/export openings can at the same time be blocked, for example to prevent a packaging tray from falling out of the tray carrier during conveyance.

In an alternative embodiment of a tray carrier according to the invention, the tray carriers are provided with movable engagement means for engaging with a packaging tray for carrying the conveyed tray. FIG. 14 shows for example a tray carrier provided with two mutually facing L-shaped walls, the horizontal part of the L shapes forming the support platform. The walls, or arms, are at the top side movably suspended from the part of the tray carrier that is coupled to the conveyor track. The two arms can be moved with respect to each other with the aid of activation means (not shown in the figure). For example, activation means can be provided in the form of a drive forming part of the tray carrier or a guide which forms part of an export station and which engages with cams provided on the movable arms of the tray carrier.

In this way, the walls form, as it were, a claw for engaging with a packaging tray from above. The claw can engage below the bottom or below a flange of the packaging trays. In the exemplary embodiment shown, the tray carrier supports the packaging tray below the bottom.

For exporting the packaging tray, the two arms of the tray carrier, and thus of the support platform, can for example be moved apart from each other.

A tray carrier of this type is suitable for accommodating packaging trays from above, for example from an import track which extends at least partially below the conveyor track and which at least partially coincides with the endless conveyor track. An import track of this type can be embodied as an important platform on which the packaging tray is placed. Alternatively, the import track can be embodied as a conveyor belt. A conveyor belt of this type can supply the packaging trays in a direction lying substantially perpendicular to the conveyor track, but can also extend at least partially parallel to the conveyor track, as illustrated in the right portion of FIG. 21.

A tray carrier of this type is also suitable for delivering a packaging tray to an export platform positioned below the tray carrier. An export platform of this type can for example also be provided with a conveyor belt in order to move the packaging tray delivered to the platform out of the conveyor track. This has the advantage that the export platform is immediately freed up again for unloading a following packaging tray.

A tray carrier of this type is also suitable for sliding a packaging tray into/out of the tray carrier in the horizontal direction. This allows the tray carrier to be combined with various types of import stations and export stations.

Figure 29:
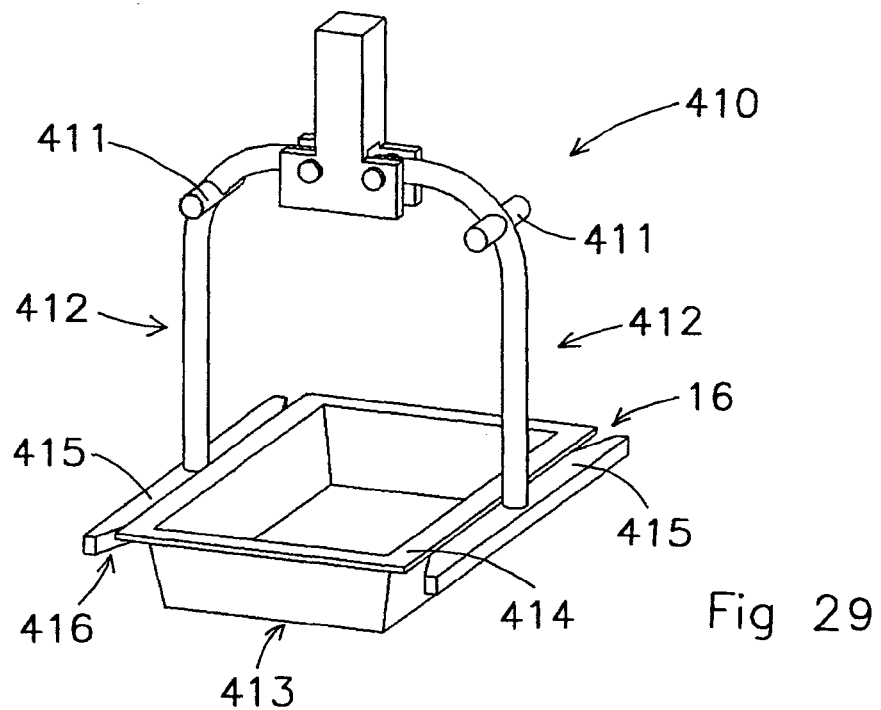
FIG. 29 is a perspective view of a further alternative tray carrier according to the invention.

A further embodiment of a tray carrier 410 according to the invention, provided with arms 412 which are movable with respect to one another and an interrupted support platform, is shown in FIG. 29. The tray carrier 410 shown in this figure is configured for supporting a packaging tray 413 below a flange 414 along the opening of the packaging tray. For this purpose, the tray carrier 410 is provided with two arms 411 which are movable with respect to each other and each provided with a strip-shaped support surface 415 for supporting the flange 414 of a packaging tray 413.

The movable arms 412 of the tray carrier 410 are suspended in such a way that, if the tray carrier is not provided with a packaging tray, the distance between the support strips 415 is less than the width of the packaging tray. The strips 415 taper at their ends into a point 416, as a result of which the distance between the support strips increases and an import opening is formed.

A packaging tray is imported by pushing the packaging tray, while the packaging tray rests on an import track which preferably moves in conjunction with the tray carrier in the conveyance direction, via the import opening between the support strips. During importing, the packaging tray is supported at a level such that the flange of the packaging tray is located at a level equal to, or higher than, the level of the support strips.

Pushing the packaging tray between the support strips causes the two arms to move somewhat apart from each other. The arms hinge apart and rotate counter to gravity. As a result, the arms exert a compressive force on the packaging tray and the packaging tray is clamped between the support strips.

Subsequently, the tray carrier can take over the supporting of the packaging tray from the import platform. For this purpose, the tray carrier is preferably suspended from the trolley so as to be movable in the vertical direction. A tray carrier of this type can for example be provided with a drive, such as a piston or motor, or with a cam for interaction with a cam track at an import station, for raising and lowering a packaging tray by moving the tray carrier in the vertical direction.

In an alternative embodiment, the conveyor track is embodied in such a way as to ascend somewhat to the point where a packaging tray is slid between the support strips, so that the tray carrier raises the packaging tray from the import track. In an alternative embodiment, the import track can extend at that point in the downward direction or end just past that point so that the packaging tray is lowered with the flange onto the support strips.

For exporting the packaging tray, the arms are moved apart from each other above an export track. This export track can for example be embodied as an export platform or as a conveyor belt. If the export track is embodied as a conveyor belt, then the direction of conveyance of this belt preferably forms an angle to the conveyor track that is substantially perpendicular so that the exported packaging tray is removed from the conveyor track in an efficient manner. In the preferred embodiment shown, the arms are provided with a cam 411 which engages with a guide at an export station (not shown) for moving the two arms 412 apart from each other and delivering a packaging tray. In an alternative embodiment, the tray carrier can for example be provided with a drive for moving the arms apart from each other.

The tray carrier shown in FIG. 29 is also suitable for accommodating packaging trays from above, for example from an import track which extends at least partially parallel to and below the conveyor track and which at least partially coincides with the endless conveyor track as illustrated in the right portion of FIG. 21 or 22. Alternatively, the import track can also lie substantially perpendicularly to the conveyor track.

The tray carrier shown in FIG. 29 can be exported, by increasing the distance from the pivot points of the arms 412 to the centre line of the tray carrier, in such a way that the support strips 415 of the tray carrier clamp the packaging tray only once the ends have turned past their lowest point. The support strips then move upward during the accommodating of the packaging tray.

This has the advantage that packaging trays of various heights can be accommodated from the same import track without it being necessary to adapt the height there with respect to the support strips. In this embodiment, the tray carrier also raises even the packaging tray from the import track so that it is possible to select a simple embodiment for both the import track and the conveyor track.

Figure 28:
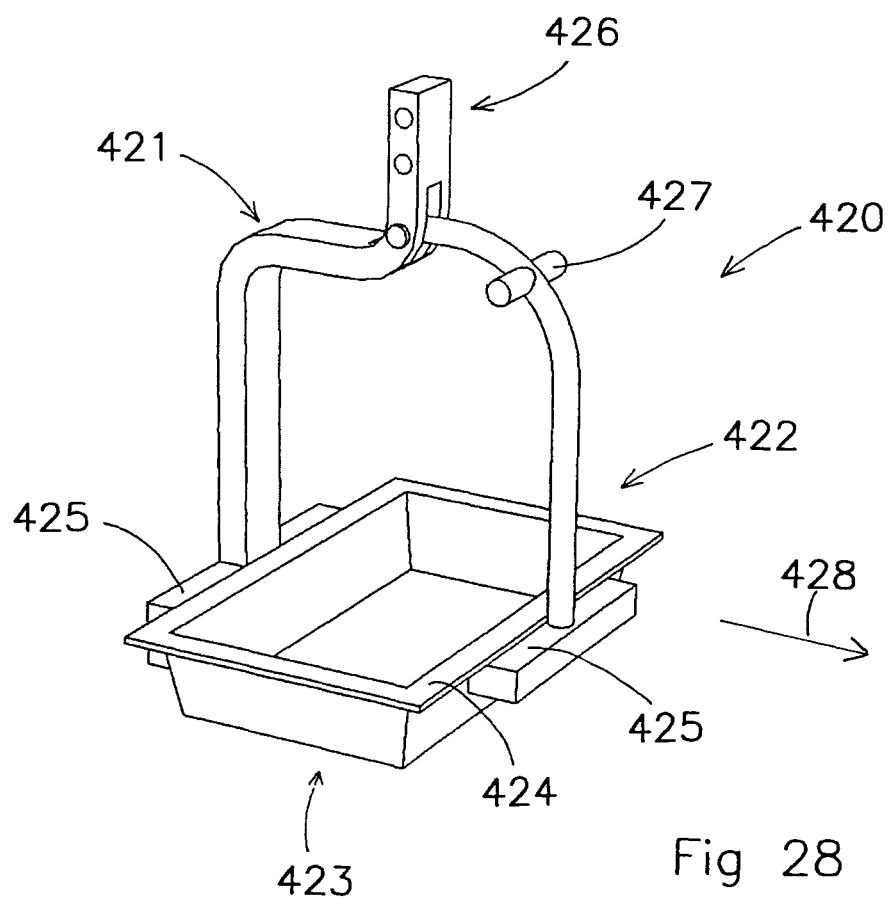
FIG. 28 is a perspective view of a further alternative tray carrier according to the invention.

A further embodiment of a tray carrier 420 according to the invention, provided with arms 421, 422 which are movable with respect to each other and an interrupted support platform, is shown in FIG. 28. The tray carrier 420 shown in FIG. 28 is provided with two arms 421, 422 which are movable with respect to each other, one arm 421 being securely connected to a trolley (not shown) via a coupling part 426 and the other arm 422 being hingably connected to the coupling part 426. Each arm is provided with a strip-shaped support surface 425 for supporting a flange 424 of a packaging tray 423. The tray carrier 420 is advanced, at least during the importing of a packaging tray 423, to a position wherein the support strips 425 extend at a direction transverse to the conveyance direction, indicated by arrow 428.

For importing a packaging tray, the tray carrier is moved over an import platform with the movable arm in an upwardly turned-away position. The fixed arm is in this case located at a level such that the support strip of the fixed arm is located below the level of a flange of a packaging tray.

By moving the tray carrier over an import platform in this way, the fixed arm can engage with a packaging tray and subsequently push the packaging tray onward at a speed equal to the conveying speed of the tray carrier. Preferably, the difference in speed-between the tray carrier and the packaging tray at the moment when the fixed arm engages with the packaging tray is limited; for example as a result of the fact that the packaging tray is advanced, during importing in the conveyance direction, over, or through, the import track at a speed somewhat lower than the conveying speed of the tray carrier. Thus, the fixed arm can engage with the packaging tray without excessively speeding up the packaging tray, and the forces exerted on the packaging tray remain limited. This limits the risk of damage to the packaging tray.

When the fixed arm engages with the packaging tray, the movable arm is lowered so that the arms engage with the packaging tray from two sides. Subsequently, the packaging tray is raised so that the tray carrier takes over the supporting of the packaging tray from the import platform. For this purpose, the tray carrier is preferably suspended from the trolley so as to be movable in the vertical direction. A tray carrier of this type can for example be provided with a drive, or with a cam for interaction with a cam track at an import station, for raising and lowering a packaging tray by moving the tray carrier in the vertical direction.

In an alternative embodiment, the packaging tray is raised as a result of the fact that the conveyor track is embodied in such a way as to ascend somewhat to the point above the import platform where the packaging tray is secured. As an alternative, the packaging tray can be moved in the downward direction, for example as a result of the fact that the import track extends at that point in a downward direction, or ends just past that point, so that the flange is lowered onto the support strips.

For exporting the packaging tray, the arms are moved apart from each other above an export track.

In a preferred embodiment, the movable arm 422 is provided with a cam 427 which engages with a guide at an import station or export station (not shown) for moving the arm upward and subsequently back downward. In an alternative embodiment, the tray carrier can for example be provided with a drive for moving the arm.

Figure 22:
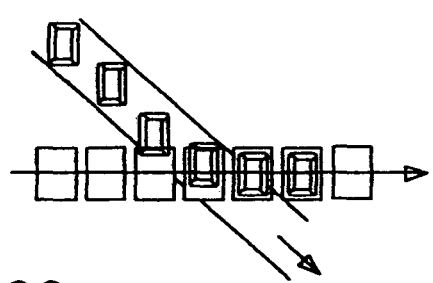
FIG. 22 shows a further alternative import station provided with an import track which partially coincides with the conveyor track.

A tray carrier of this type is suitable for accommodating packaging trays from above, for example from an import track extending at an angle to the conveyor track as illustrated in the right portion of FIG. 22. It is also possible for this angle to be a perpendicular angle. As an alternative, it is possible to use a simple import platform which at least partially coincides with the conveyor track or a conveyor belt which runs parallel to the conveyor track and at least partially coincides there, as shown in FIG. 21.

A tray carrier of this type is also suitable for delivering a packaging tray to an export track positioned below the tray carrier, for example an export platform or a conveyor belt for conveying the packaging trays onward.

FIG. 16 shows a tray carrier 370 provided with import means in the form of an entrainment means 371 for importing a packaging tray 2 positioned on an import platform 372 extending in the track of the tray carrier.

The entrainment means 371 extends at a level above the support platform 308 of the tray carrier 370. When the tray carrier 370 passes the import platform 372 in the conveyance direction 310, the entrainment means 371 moves along the top of the import platform and the support platform 308 moves along below the import platform 372. The entrainment means 371 engages with the packaging tray 2 positioned on the import platform 372 and moves the packaging tray from the import platform onto the support platform 308 of the tray carrier 370.

In the exemplary embodiment shown, the entrainment means is embodied as a fixed arm. In an alternative embodiment, the entrainment means can for example be embodied so as to be movable with respect to the support platform. Preferably, an entrainment means is movable in the vertical direction between a position close to the support platform, corresponding to the position shown in FIG. 16, for engaging with a packaging tray on an import platform, and a position set apart from the support platform for passing an import platform without importing a packaging tray from that import platform.

In a further embodiment, the tray carrier is movable over the support surface for pushing a packaging tray from that surface. Preferably, a tray carrier is provided with an entrainment means of this type so as to be rotatable about a vertical axis. In a first position, corresponding to the position shown in FIG. 16, a packaging tray can be imported. In an alternative position, the tray carrier is rotated about the vertical axis over an angle of 90 degrees for exporting the packaging tray in a direction transverse to the conveyance direction.

A conveyor system comprises a control system for activating at least the drive means for displacing the chain of tray carriers in a direction of conveyance along the conveyor track. Preferably, the chain of tray carriers is advanced at a constant speed and the controlling of the drive means remains limited to activating and deactivating said drive means.

A conveyor system of this type can be provided with stand-alone import stations and export stations comprising a control system with detection means for detecting passing tray carriers and/or packaging trays in said tray carriers and/or the contents of said packaging trays. The control system is also configured for activating import and/or export means for activating the import on the basis of the information obtained, or export means for selectively importing or exporting packaging trays into or out of tray carriers in the conveyor track.

In a preferred embodiment, the conveyor system according to the invention is provided with a control system in the form of a distribution control system, configured for activating two or more export stations. A distribution control system is suitable for performing the functions of a control system and is, in addition, configured for determining the position of each tray in the conveyor system.

For this purpose, the distribution control system is provided with chain position determining means for determining the position of the tray carriers with respect to a fixed point along the conveyor track, for example with respect to an import station, an export station or a treatment station.

A distribution control system is also provided with electronic memory means with a memory table comprising, for each carrier, at least one memory field for accommodating at least one characteristic of a packaging tray and/or contents of said packaging tray, and at least one memory field for storing a variable which is representative of the tray carrier in which the tray is placed by an import station.

A control system of this type is also provided with receiving means for receiving information about tray carriers and/or product information concerning the packaging trays and/or the contents of packaging trays, which information is received by an import station or detectors, for example, along the conveyor track.

In a preferred embodiment, at least some of the tray carriers are provided with tray carrier identification means, for example an optical identification code, for example in the form of a symbol and/or colour coding, which enable the control system to determine the position of the tray carrier with respect to the rail and/or the chain of tray carriers. The tray carriers are preferably provided with identification means suitable for contactless detection, for example magnetic, inductive, optical or radiographic detection. In an alternative embodiment, the identification codes can also be connected to chain elements between the tray carriers or trolleys.

The distribution control system is also preferably provided with detection means, for example a camera or radiographic receiver, for signalling the identification means of the tray carriers. Furthermore, the distribution control system is preferably provided with information concerning the conveyor system such as, for example, the number of tray carriers and the position of the import stations, export stations and any treatment stations along the conveyor track. The distribution control system is preferably also provided with information concerning the driving speed of the tray carriers along the conveyor track.

On the basis of the information which the distribution control system has about the individual tray carriers and the conveyor system as a whole, it can continuously determine the position of a tray carrier in the conveyor system.

If the distribution control system is for example familiar with the construction of the chain, for example the number of tray carriers from which the chain is constructed, then the position of the remaining tray carriers can easily be ascertained on the basis of the position, with respect to the rail, of one or more identification points in the chain.

In a preferred embodiment of the chain position determining means, the chain of trolleys and tray carriers comprises at least a single recognizable chain element having an identification mark, which chain element is called the reference chain element. A recognition sensor is then arranged along the track for detecting that recognizable reference chain element.

The position determining means also comprise a counting device, arranged at a location along the track, usually at the recognition sensor, for counting the tray carriers which pass after the reference chain element has passed.

The position determining means also comprise electronic memory means with a memory table comprising, for each carrier, at least one memory field and wherein the locating means for each carrier in a memory field accommodate a variable which is representative of the number of tray carriers counted by the counting device since the reference chain element has passed.

In the case of the conveyor system described hereinbefore, a serial number, as it were, is assigned in the distribution control system to each carrier, starting from the reference chain element. The memory table further comprises for each carrier, in addition to the memory field with the serial number of the carrier, also one or more memory fields for storing information concerning the packaging tray placed in the tray carrier and/or the contents of said packaging tray. For example, an item of data of the product in question, for example the weight of the filled packaging tray, the date on which the packaging tray was filled, the time at which the packaging tray was sealed, etc., can also be stored in a memory field of this type.

Preferably, a control system comprises, both upstream and downstream, with respect to the direction of advancement of the conveyor track, of an import station, detection means which signal whether or not a tray carrier is provided with a packaging tray. On the basis of the information obtained from these sensors, it is possible to ascertain whether a tray carrier in the import station in question is provided with a packaging tray. In a preferred embodiment, it is known what type of packaging trays and/or products have been imported into the import station in question, so that this product information can be linked to the carrier in question. A system of this type is particularly suitable in combination with an import station where packaging trays are placed in the tray carriers by hand.

The conveyor system according to the invention can also be configured for adding tray identification means to the packaging trays, for example by printing a code on the tray, sticking an identification sticker to the tray or adding an insert provided with a code.

The invention also relates to an insert comprising an RFID tag (radiographically detectable identification means). The insert serves as a carrier for the RFID tag, in particular as a carrier of the antenna of the RFID tag.

An RFID tag is used as an information carrier and identification means of products and has the advantage of being able to be read out contactlessly and remotely. In order for an RFID tag to operate properly, it is important that the antenna take up as large a surface area as possible.

In practice, the packaging of food products provides just limited space for attaching an RFID tag; for example, as a result of the fact that much of the surface area of the packaging is already taken up by visual product information such as readable information concerning the contents, shelf-life and the like.

The material of a packaging is often also unsuitable for fastening an RFID tag to the packaging. This is particularly true of food products which are packaged in plastics material packaging trays sealed with a film. The plastics material trays and the seal film usually do not provide a suitable, preferably flat, base for fastening an RFID tag.

Attaching an RFID tag to an insert has the advantage that the RFID tag can easily be placed in the packaging tray.

Furthermore, as a result of the fact that the insert is placed on the bottom of the packaging tray, the combination of the insert and RFID tag, in particular the antenna of the RFID tag, covers the entire bottom without making it impossible to visually inspect products placed in the tray or product information printed on the packaging.

Furthermore, after the filling and packaging of the tray, the insert is positioned below the food product, making it difficult for a shoplifter, for example, who wishes to prevent detection of the RFID tag, to remove the tag. The combination of the RFID tag with the insert has the further advantage of being easy to separate from the food product, for example before preparing the food product.

The RFID tag can be integrated into the material of the insert, for example if the insert is embodied as a laminate made of various materials, the RFID tag being attached between two material layers. The RFID tag can also be attached to the top or underside of the insert.

In a preferred embodiment, the insert is made at least partially of material for promoting the shelf life and/or the presentation of the food products in the packaging tray. The insert can for example be embodied as a sheet of absorbent material with an RFID tag at one side. Absorbent insert sheets are for example known in the meat processing industry and are placed below the meat product on the bottom of the packaging tray. The absorbent material serves to take up moisture in order in this way to prevent pools of moisture from forming in the packaging tray.

An advantage of this system is that the packaging trays can be tracked as a result of the scanning of the code, instead of indirectly via the coupling of the packaging trays to the tray carriers. This limits the risk of an error in the information. In addition, this system allows a packaging tray to be tracked in a simple manner when the packaging tray is located not in a tray carrier, but for example in a treatment station or in an export station.

A conveyor system according to the invention is preferably configured for conveying a packaging tray in an open state, at least along a part of the conveyor track, so that food products can be placed in the tray and/or treatments can be carried out on the products placed in the tray during or after conveyance.

In a preferred embodiment according to the invention, the conveyor system is provided with one or more treatment stations which are arranged along the path of a conveyor device and are provided with a treatment device for performing in an automated manner treatments on at least some of the passing trays and/or food products in said trays.

Examples of the treatments which could be carried out on packaging trays and/or the contents thereof with the aid of a treatment station of this type comprise: filling a packaging tray with food products, weighing the packaging trays, sealing the packaging tray with a film, adding an additive to the products in the tray, for example an additive in the form of a marinade, a packet of sauce, a food product, an insert, X-raying the packaging tray and contents for the presence of undesirable metal particles, etc.

Treatment stations of this type can be arranged in line with the conveyor track or parallel to the conveyor track. In the former case, the treatments are carried out on the packaging trays and/or the contents thereof while they are placed in the tray carriers. In the latter case, the treatment stations are configured for accommodating the packaging trays from the tray carriers prior to the treatment and the delivery of the packaging trays to the tray carriers following the treatment. For this purpose, the treatment station is provided with an import station and an export station, preferably an import station and an export station as previously described.

Figure 10:
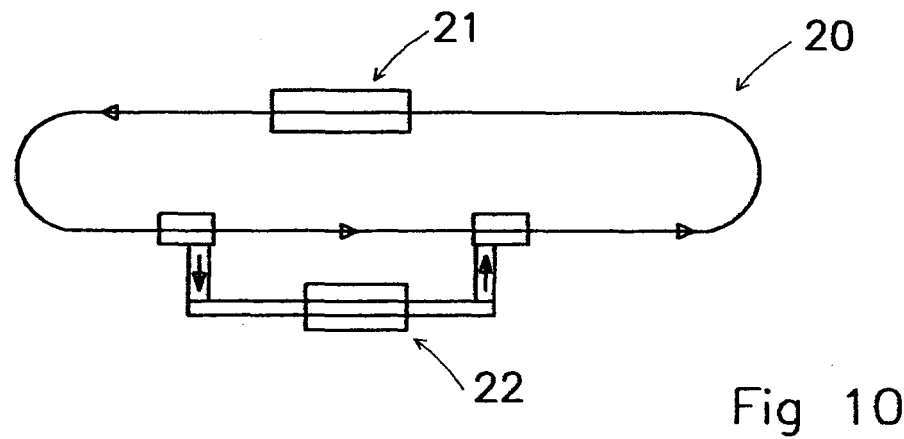
FIG. 10 shows a treatment station in an in-line position and a treatment station in a parallel position with respect to a conveyor track according to the invention.

FIG. 10 is a schematic representation of a conveyor track 20 provided with a first treatment station 21 arranged in line with the conveyor track and a second treatment station 22 arranged parallel to the conveyor track.

When a treatment station is arranged parallel with the conveyor track, it can be configured for exporting packaging trays, with respect to the treatment station, upstream from the conveyor track and, after the treatment has been carried out, importing the conveyed trays downstream of the treatment station, in particular downstream of the import station of the treatment station in question, back into the conveyor track. In a treatment station of this type, the packaging trays are displaced parallel to the conveyor track and in the conveyance direction. Preferably, the length and/or the speed of the conveyor track and the treatment station are adapted to each other in such a way that a packaging tray, once treated, is returned to the same carrier as that in which the packaging tray was supplied to the treatment station.

In a preferred embodiment of a parallel treatment station according to the invention, the treatment station is configured for selectively accommodating the packaging trays from the tray carriers and/or selectively delivering the packaging trays to the tray carrier. The treatment and/or the accommodating of the tray from the conveyor track is preferably activated by the control system of the conveyor system on the basis of the information available in the memory of the control system about the tray and/or the contents of the tray. In an alternative embodiment, the treatment station can be provided with a stand-alone control system which is provided with its own detection means and/or receives product information from the control system of the conveyor system.

In a further embodiment of a treatment station according to the invention, a treatment station is configured for exporting the packaging trays, with respect to the treatment station, downstream from the conveyor track and, after the treatment has been carried out, importing the conveyed trays, upstream of the treatment station, back into the conveyor track. In a treatment system of this type, the packaging trays are displaced parallel to the conveyor track and in an opposite direction to the conveyance direction.

The advantage of a conveyor system of this type is that a packaging tray can be treated again and again by the same treatment station.

For example, a treatment station is arranged parallel to the conveyor track for marinating a chicken fillet placed in a packaging tray. In the conveyor track, a sensor is arranged between the import and the export of the marinating station for detecting the colour of the chicken fillets placed in the packaging trays. If the colour of the chicken fillets is too pale, the packaging tray in question is fed out of the conveyor track during exporting and the chicken fillets are marinated in the marinating station. After the marinating, the packaging tray is imported back into the conveyor track. The sensor for detecting the colour of the chicken fillets can then ascertain whether the chicken fillets are sufficiently marinated based on the colour of the marinated chicken fillets. If the chicken fillets are not sufficiently marinated, the packaging tray can be passed through the marinating station again for applying a second layer of marinade.

In order to allow the packaging trays to be returned to the conveyor track upstream, a conveyor system of this type is provided with a control system which does not fill all the tray carriers, or does not fill them completely, with packaging trays. For example, every other tray carrier can be filled or one in five tray carriers can be left empty. In an alternative embodiment, initially all the tray carriers can be filled with packaging trays, but part of this is already carried out before the chain of tray carriers passes a treatment station of this type.

Preferably, a treatment station of this type is provided with a buffer for retaining packaging trays until an empty tray carrier passes by.

Figure 11:
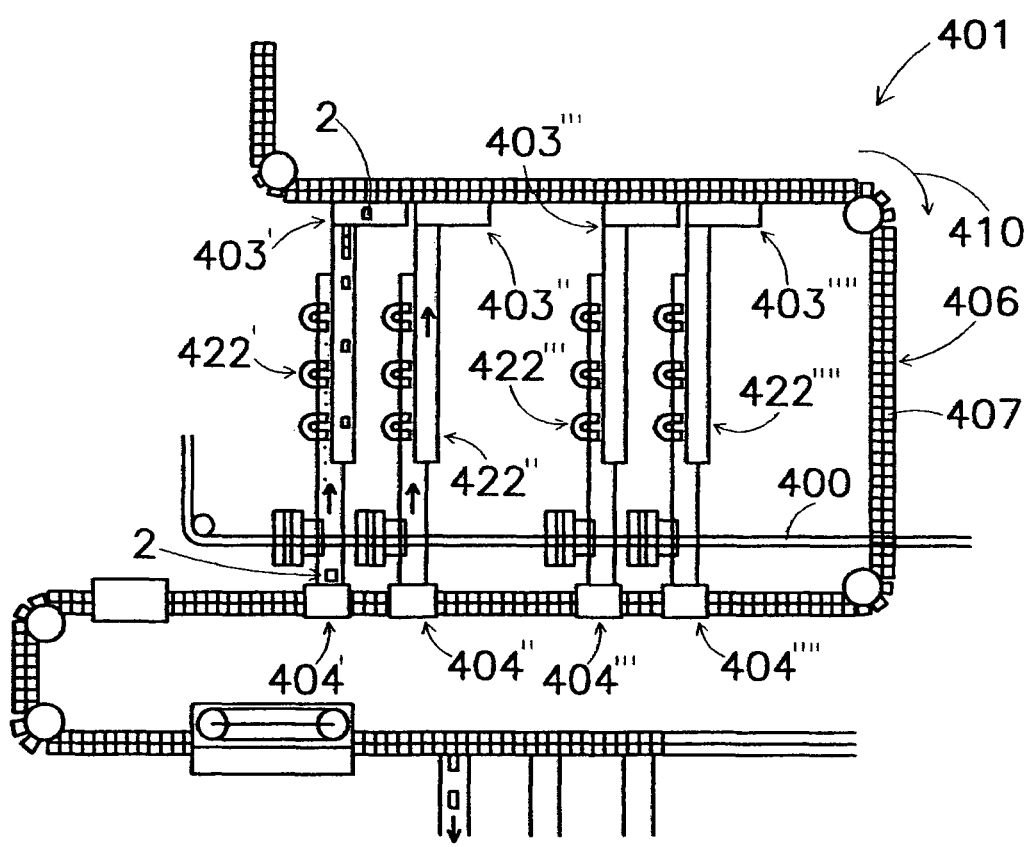
FIG. 11 is a plan view of a configuration of a conveyor track and a plurality of treatment stations according to the invention.

Figure 11 shows a preferred embodiment of a conveyor system 401 according to the invention, the packaging trays being returned, after a treatment upstream, to the chain of tray carriers. In the arrangement shown, the conveyor track 406 is combined with four treatment stations 422'-422'''', in particular filling stations. The treatment stations are each provided with an export station 404'-404'''' positioned downstream for exporting packaging trays from the conveyor track, and an import station 403'-403'''' positioned upstream for importing packaging trays, once treated, into the conveyor track. In the filling stations in question, packaging trays 2 are filled with food products, in this case with chicken legs in the first station 422', chicken wings in the second station 422'', chicken fillets in the third station 422''' and packets of sauce in the fourth filling station 422''''. In the version shown, a single supply track 400 stocks the various filling stations. In alternative embodiments, one or more treatment stations can for example be stocked by separate supply tracks.

The four filling stations are all arranged parallel to the conveyor track. This allows a packaging tray to be fed repeatedly along one or more of the treatment stations. For each packaging tray, a specific combination of products can thus be combined to form what is known as a BBQ pack. Depending on customer preferences, for example, or the products on offer, various packs can be assembled. It is also possible to accommodate a weighing station, for example, in the conveyor track between the import and the export of the treatment stations in question, for optimizing the weight of the BBQ pack in such a way that the packs are for example all as close to 3 kg as possible. For example, a relatively light chicken wing or a relatively heavy chicken fillets can be added to the pack as a function of the total weight of the products already placed in the packaging tray.

A conveyor system according to the invention is preferably provided with means for tracking a packaging tray in such a way that the position of a packaging tray is continuously known not just in the conveyor track, but also in a supply station, export station or treatment station.

A treatment station arranged parallel to the conveyor track can for example be provided with an export station, a conveyor track and an import station. This conveyor track can be divided up into a series of sections each having its own characteristic. This characteristic can be passed on to the control system of the conveyor system and for example be placed in a memory field allocated to the packaging tray in question. For this purpose, the memory field can for example be used for storing the tray carrier in which the packaging tray is supplied to the treatment station. The control system of the conveyor system is in this way familiar with the position of the packaging tray while the packaging tray is conveyed through the treatment station until the packaging tray, once treated, is returned to a tray carrier.

In an alternative embodiment, it is known in advance how much time a particular treatment will take. If the treatment takes 30 seconds, from export from the conveyor track to import into the conveyor track, then the packaging tray which is exported to a treatment station at moment x seconds is the same as the packaging tray which is imported from that treatment station at moment x+30 seconds.

In this way, the position of the packaging tray is known, and the information known about the packaging tray and/or the contents of the packaging tray is continuously linked to said packaging tray.

The invention also relates to a system for processing food products, preferably meat products. A food processing system of this type comprises a processing device for processing food products, at least one filling station wherein packaging trays are filled with food products supplied from the processing device, and a conveyor system configured for conveying packaging trays from one or more import stations to one or more export stations.

A food processing system of this type can for example comprise a slaughter line for slaughtering poultry, one or more filling stations where cuts of meat are placed in packaging trays, and a conveyor system for distributing the packaging trays over various export stations for assembling orders. Packaging stations for sealing the trays can be placed before the conveyor system or, if treatments still have to be carried out on products placed in the packaging tray, after the conveyor system or as a component of the conveyor system.

A conveyor system in a food processing system according to the invention comprises a rail following an endless conveyor belt to which a chain of tray carriers is coupled. The tray carriers are configured for conveying at least one packaging tray along at least a part of the conveyor track and are provided with a support platform for at least partially supporting at least one packaging tray.

The conveyor system comprises drive means for displacing the chain of tray carriers in a conveyance direction along the conveyor track, at least one import station for, preferably selectively, importing the packaging trays into the tray carriers and at least one export station for selectively exporting the packaging trays from the tray carriers.

The processing system is also provided with a control system for activating at least the drive of the conveyor system and configured for determining the position of each tray in the conveyor system. The control system comprises chain position determining means, which can determine at least the position of the chain of the carriers with respect to the track, and an electronic memory means with a memory table comprising, for each carrier, at least one memory field for accommodating at least one characteristic of the tray and/or contents of the tray and comprising at least one memory field for storing the carrier in which the tray is placed during conveyance along the conveyor track.

In a preferred embodiment, the control system of the processing system is configured for obtaining product information concerning individual food products from the processing device, the filling stations or the treatment stations and for linking this information to the tray in which that food product is placed. On the basis of this product information, the packaging tray in which the product is placed, and/or the contents of the packaging tray, can be exposed or not exposed to a treatment in a treatment station and/or be distributed or not distributed over various orders.

In a preferred embodiment, the control system is configured for activating the conveyor system, the one or more filling stations and the food processing device. In a further preferred embodiment, the control system is configured as a distribution control system for activating two or more export stations and for distributing packaging trays over a plurality of export stations.

The filling station in a food processing system according to the invention comprises conveyor means for supplying a tray in a filling position, conveyor means for supplying food products, filling means for placing one or more food products in a tray placed in the filling position, and conveyor means for discharging a filled tray from the filling position to the at least one import station for importing the filled tray into a tray carrier of the conveyor system.

In an alternative embodiment, the filling station can be configured for filling the tray carriers in line. The packaging trays are then filled while they are accommodated in the tray carriers.

Preferably, the filling means of the filling station are configured for importing food products in such a way that, for each placed food product, the position in the tray is known. This is possible, for example, by stacking products or placing them next to one another in a row. The system can then ascertain at which position each product is placed in the packaging tray. This is possible, for example, by assigning a number to the products.

For example, 12 chicken legs are supplied to the filling station via the conveyor means. The farm from which the chicken originated is stored in the memory of the control system of the processing system for each chicken leg. During the filling of the packaging tray, the chicken legs are placed in the packaging tray one at a time, in two rows of six chicken legs. Which chicken leg is placed in which of the twelve positions in the packaging tray is then stored, in combination with an identification of the tray, in the memory of the processing system. Because it is known for each chicken leg not only in which packaging tray it is placed, but also at which position in the packaging tray, the product information of each chicken leg can also be retrieved after the chicken leg is placed in the packaging tray. Ordinarily, individual items of product information are lost as a result of the fact that the plurality of products are placed at random in a packaging tray.

The products can be packed into a filling station by hand. Preferably, the products are provided in order, one at a time, to a packer so that the packer packs the products in the order in which they are provided. In a preferred embodiment, the products are placed mechanically in the packaging trays. This can be done, for example, by a packing robot which places the products provided in the packaging in a fixed order and a fixed pattern.

By placing the products in a tray at positions which are fixed with respect to one another, the position of each product in the conveyor system remains known. The product information known in the system can be recalculated for the individual products with the aid of a filling station of this type, even after the products have been placed in the tray.

A further embodiment of a processing station according to the invention provides a plurality of filling stations for placing various food products in a packaging tray. In this way, the system is for example suitable for assembling a packaging with a plurality of products, for example a BBQ pack comprising a plurality of types of meat products or a stir-fry pack comprising a plurality of types of vegetables.

A processing system for processing food products according to the invention is preferably provided with product carriers and/or a conveyor system as described hereinbefore in this text. Preferably, the conveyor system is configured for conveying the packaging trays in a position with a substantially horizontal orientation and for feeding the packaging trays into and out of tray carriers substantially in a position with a substantially horizontal orientation. Furthermore, the conveyor system is preferably provided with import means and/or export means configured for pushing out of the carrier in a desired direction actively and in a controlled manner, and preferably at a controlled speed. In a conveyor system of this type, the risk of the products becoming shaken up and changing places during conveyance, as a result of which the individual product information would be lost, is minimal.

In a conveyor system or a processing system according to the invention, the chain of tray carriers can be constructed from a single type of tray carrier or from two or more different types of tray carriers. Thus, some of the tray carriers may be configured for carrying low packaging trays on a support platform, while other tray carriers are configured for supporting high packaging trays via a flange.

Figure 25:
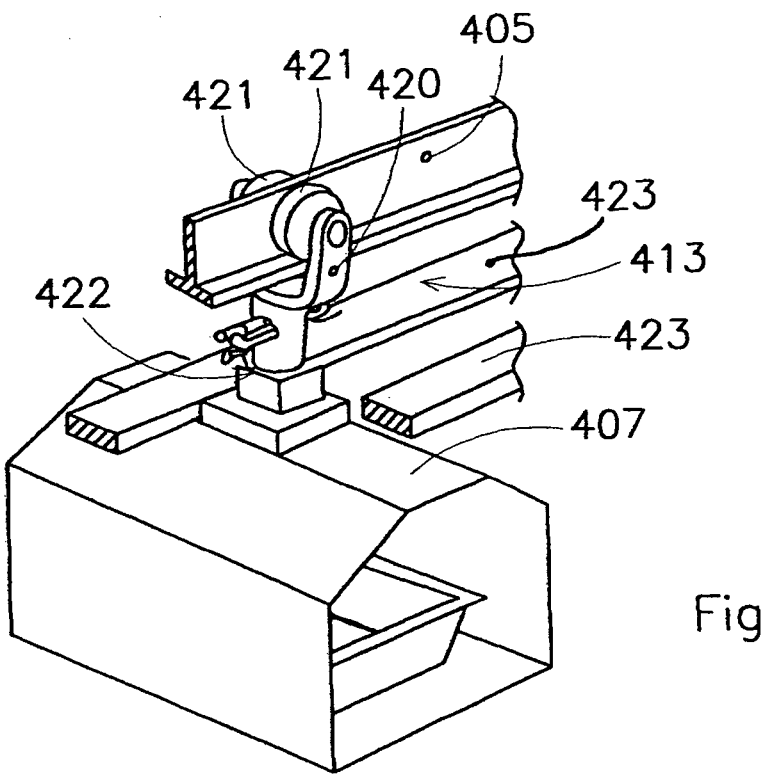
FIG. 25 is a perspective view, partially in cross section, of a conveyor track 400.

FIG. 25 is a perspective view, partially in cross section, of a preferred embodiment of a conveyor track 400 provided with a trolley 413 and a tray carrier 407 connected thereto. The conveyor track 400 is provided with a rail 405 which is T-shaped in cross section and of which the vertical leg extends upward. The portion of the trolley 416 that engages with the rail 405 is preferably embodied as a U shape 420, the two legs being provided at the mutually facing sides with a wheel 421. The wheels 421 rest on the horizontal parts of the rail 405 and on both sides of the vertical part. The tray carrier 407 is connected to the U-shaped frame 420 of the trolley 413 via a connecting element 422. Preferably, the connecting element 422 is configured for connecting the tray carrier to the trolley so as to be displaceable hingeably, rotatably or in the vertical direction.

Figure 24:
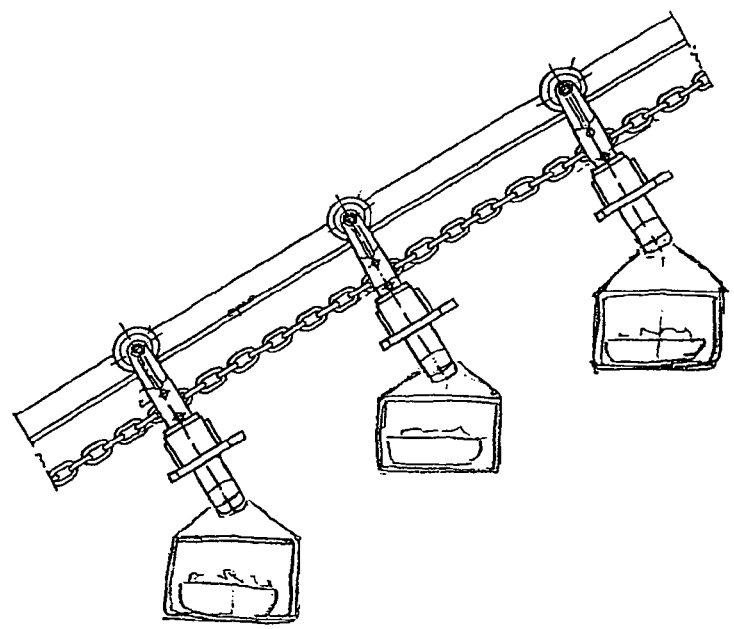
FIG. 24 shows a conveyor track at an angle to the horizontal.

A tray carrier can be hingeably connected to the trolley in such a way that the tray carrier can for example tilt about an axis transverse to the conveyance direction. An embodiment of this type is particularly suitable for conveying in a horizontal position packaging trays along conveyor tracks having a, partially, diagonal course. For example, FIG. 24 shows trolleys which are advanced along a rail forming, viewed in the conveyance direction, an angle to the horizontal. Because the trolleys are hingingly connected to the tray carrier, the trolleys retain their horizontal orientation.

The connecting element is preferably configured for interaction with guide rails along the conveyor track for additionally supporting the trolley in such a way that the trolley, in particular the tray carrier, does not wobble, or wobbles only to a limited degree, during conveyance. In FIG. 25, the conveyor track is provided on either side with guide rails 423 interacting with (a portion of) the connecting element 422. For example, when a treatment is carried out on a packaging tray in the tray carrier or when the conveyor track bends sharply, the trolley is preferably supported in the sideways direction so that the tray carrier does not come to hang obliquely from the rail. The guide rails can for example also be used for, temporarily, positioning in a fixed position a tray carrier which is connected to the trolley so as to be rotatable about a vertical axis.

Preferably, a tray carrier according to the invention is connected to a trolley so as to be rotatable about a vertical axis and the conveyor system is provided with turning means for rotating a tray carrier.

FIG. 26 shows a tray carrier provided with a connecting element for suspending a tray carrier so as to be rotatable about a vertical axis.

In a preferred embodiment, the turning element is embodied as a Maltese cross for interacting with cams along the conveyor track. A tray carrier provided with a turning element of this type can be rotated by moving a cam in the track of the tray carrier, in particular in the track of the turning element, in such a way that the cam engages with the turning element and the tray carrier rotates, as it passes the cam, by a quarter of a turn, for example, about the vertical axis. The rotating and positioning of objects with the aid of a Maltese cross is a simple and generally known process and will therefore not be commented on at length.

An alternative turning element can consist of an assembly of arms. The arms of the assembly interact with cams along the conveyor track in a manner comparable to the Maltese cross.

Another alternative turning element can consist of an assembly of eccentric discs which are rotated with respect to one another. These discs can be operated by bringing a guide along the conveyor track in the path of one of the discs. The guide then presses the eccentric disc in question in the direction of the conveyor track, causing the tray carrier to rotate.

Preferably, the control system of the conveyor system or of a stand-alone treatment station is configured for moving the cam or the guide into or out of the track of the turning element. This allows the control system to selectively rotate the tray carriers. Thus, the tray carriers can be positioned in a suitable position for importing or exporting a packaging tray, for example, or for providing the contents of a packaging tray to a treatment device. Alternatively, the tray carriers can be positioned in such a way that they do not, conversely, interact with an import, export or treatment station, for example, arranged along the conveyor track.

A tray carrier which is suspended so as to be rotatable about a vertical axis can be held in a fixed position by locking the turning element, for example, or by guide rails 423 as shown in FIG. 25, for example. In an embodiment of this type, the guide rails extend along the conveyor track and engage with a part of a tray carrier which is advanced along the guide rails in such a way that the tray carrier is held in a fixed position with respect to the guide rails.

In a further embodiment of a conveyor system according to the invention, the tray carriers are fastened not suspendedly from the trolley below the conveyor track, but resting on the trolley at the upper side of the conveyor track. This has the advantage that the tray carrier can be designed in such a way that a packaging tray placed on the conveyor platform is completely freely accessible from above. In an embodiment of this type, the bearing surface is not protected from above by the conveyor track.

Figure 32:
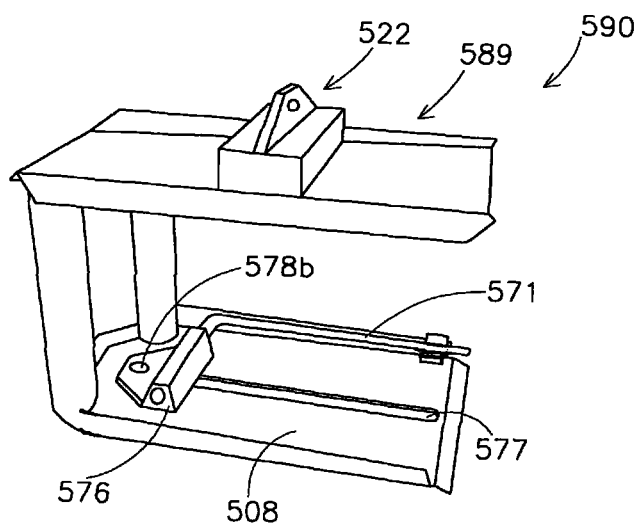
FIG. 32 is a side view of an alternative tray carrier according to the invention with an export member and an entrainment means in a first position.
Figure 33:
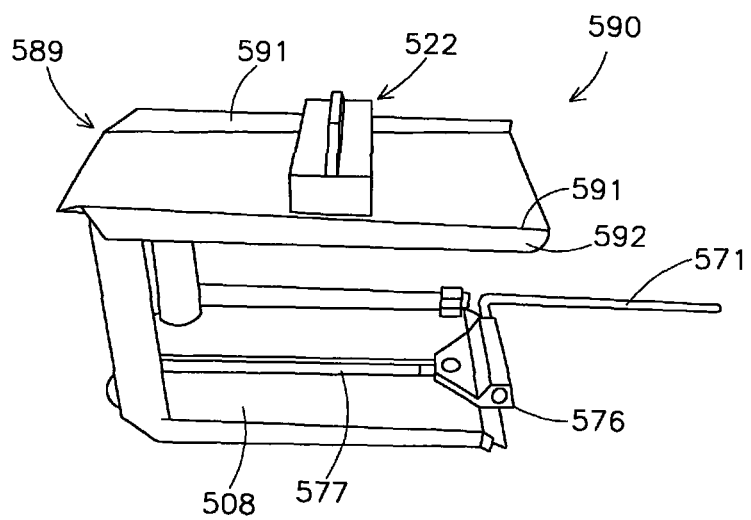
FIG. 33 is a side view of the tray carrier from FIG. 32 with the export member and the entrainment means in a second position.
Figure 34:
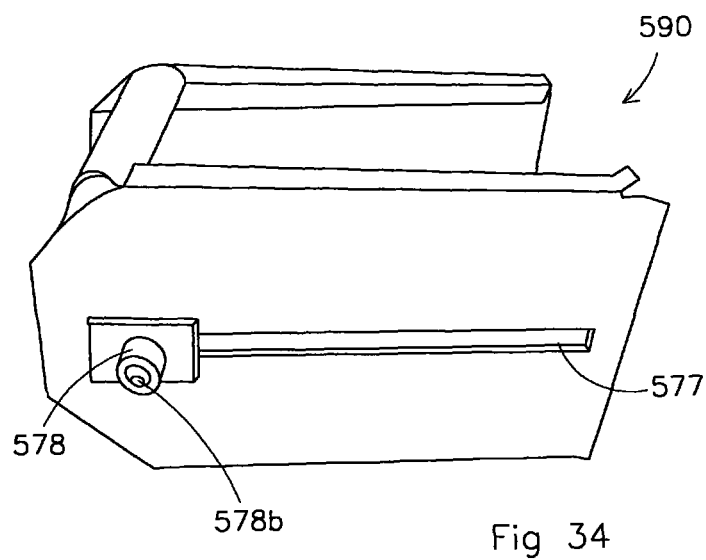
FIG. 34 is a view from below of the tray carrier from FIG. 32 with the export member and the entrainment means in the first position.

FIGS. 32-34 show a preferred embodiment 590 of a tray carrier according to the invention. The tray carrier 590 is a variation on the tray carrier 390 as shown in FIG. 26 and the tray carrier as shown in FIG. 25.

This tray carrier hangs below the conveyor track. This makes the conveyor system easier to clean. This is particularly advantageous when the system is used in the food industry, in which the cleaning of conveyor systems has to meet stringent requirements.

When, for example, foods or additives such as marinade are added to the packaging tray placed in the tray carrier, some of them may end up beside the packaging tray. When these foods or additives subsequently fall from the tray carrier, they do not end up in the chain elements, trolleys and the like of the conveyor track. This is advantageous because these components are difficult to clean. In addition, remnants of meat, for example, which end up between the chain elements can adversely influence the functioning of the conveyor system. The fact that the conveyor track is suspended from the guide also makes it easier to clean under the conveyor track, for example in order to remove foods which have fallen.

The conveyor track, trolleys and chain elements are preferably not screened off, so as to be able to clean them easily. Because the tray carriers are positioned below the conveyor track (see FIG. 35), the components of the conveyor track are set apart from staff working in direct proximity to the conveyor track. This reduces the risk of staff becoming trapped between the chain elements, trolleys, etc. This means that the conveyor track does not have to be screened off with a housing, for example, and is therefore easy to clean.

FIGS. 32-34 show a preferred embodiment 590 of a tray carrier according to the invention. The tray carrier 590 is a variation on the tray carrier 390 as shown in FIG. 26 and the tray carrier as shown in FIG. 25.

This tray carrier hangs below the conveyor track. This makes the conveyor system easier to clean. This is particularly advantageous when the system is used in the food industry, in which the cleaning of conveyor systems has to meet stringent requirements.

When, for example, foods or additives such as marinade are added to the packaging tray placed in the tray carrier, some of them may end up beside the packaging tray. When these foods or additives subsequently fall from the tray carrier, they do not end up in the chain elements, trolleys and the like of the conveyor track. This is advantageous because these components are difficult to clean. In addition, remnants of meat, for example, which end up between the chain elements can adversely influence the functioning of the conveyor system. The fact that the conveyor track is suspended from the guide also makes it easier to clean under the conveyor track, for example in order to remove foods which have fallen.

The conveyor track, trolleys and chain elements are preferably not screened off, so as to be able to clean them easily. Because the tray carriers are positioned below the conveyor track (see FIG. 35), the components of the conveyor track are set apart from staff working in direct proximity to the conveyor track. This reduces the risk of staff accidentally contacting the chain elements, trolleys, etc. This means that the conveyor track does not have to be screened off with a housing, for example, and is therefore easy to clean.

The tray carrier shown in FIGS. 32-34 is configured for accommodating and delivering packaging trays in a substantially sideways direction with respect to the direction of advancement of the conveyor track.

The support platform 508 of the tray carrier 590 has a rectangular surface, the short sides extending in the conveyance direction and form the sides of the tray carrier. The long side of the support platform form the front and rear side. The fact that the longitudinal direction of the support platform extends at an angle to the conveyance direction means that a plurality of tray carriers can be suspended from the conveyor track.

The tray carrier 590 shown is provided with a roof part 589. A roof part of this type preferably extends above at least the packaging tray and, as in the embodiment shown, over the entire support platform in order in this way to cover at least the packaging tray and the contents thereof and preferably also the support surface.

The support platform 508 of the tray carrier 590 is connected to the roof part 589 at one side, preferably opposite the import and export side for the trays. In a tray carrier of this type, the packaging tray and/or any contents of said packaging tray are freely accessible from three sides—the front side, rear side and side side—and are thus easy to reach for treatments. In an alternative embodiment, the support platform is for example connected to the roof part via two or three sides. A tray carrier can also be provided with a front wall and/or a rear wall which do not extend over the full width of the tray carrier, or in which recesses are formed in order to provide access to the packaging tray.

The fact that the tray carrier 590 is open from three sides and, viewed from the side, describes a C shape, as it were, means that it is also possible to easily carry out treatments on the packaging tray placed in the tray carrier and/or the contents thereof. Treatment means can be placed or moved in the track of the tray, carriers in such a way that the packaging trays are passed below the treatment means without the treatment means entering into contact with the tray carriers. For example, the spray head of a marinade shower or the camera of an optical scanning device can be positioned in a fixed position in the conveyor track. The packaging trays in the tray carriers are then passed below the spray head or marinade in such a way that these have optimum access to the contents of the packaging tray.

In a conveyor system comprising tray carriers of this type, it is thus possible to carry out treatments on food products which have already been placed in the packaging tray, and/or on said packaging tray during conveyance of said packaging tray in a tray carrier. For example, a meat product can be marinated in the packaging tray. This shortens the throughput time of the food product in the production process as a whole. In addition, treated food products no longer have to be handled after said treatment in order to place them in a packaging tray. This prevents the treatment from being wholly or partially nullified. For example, when a marinated piece of meat is picked up by a gripper and placed in a packaging tray, then the gripper can remove, as a result of the contact between the gripper and meat product, a part of the marinade from the meat product, for example as a result of the fact that the marinade sticks to the gripper.

The tray carrier 590 shown in FIG. 32 is provided with export means comprising a displaceable, beam-shaped export member 576 for pushing a packaging tray out of the tray carrier. The export member 576 is movably placed in a guide slot 577 which is formed in the support platform and extends in the import/export direction. The export member can be moved between a first position in the tray carrier, shown in FIG. 32, and a second position in the import/export opening of the tray carrier, shown in FIG. 33. In an alternative embodiment, the tray carrier 590 can also be provided at the underside with an additional guide, for example in the form of a rod extending along or below the guide slot 577, for improved guidance of the export member 576 through the guide slot 577.

Figure 35:
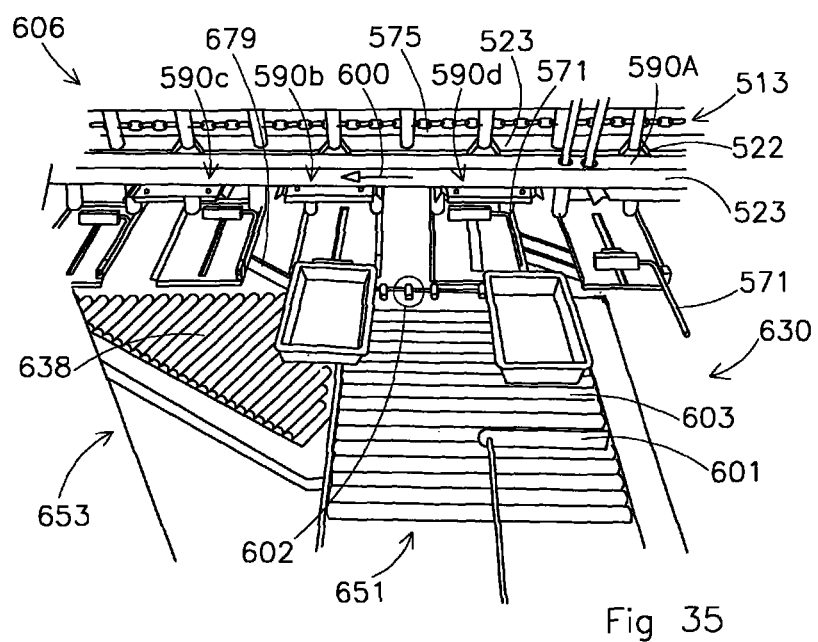
FIG. 35 shows an import station for importing a packaging tray into the tray carrier from FIG. 32.

The export member 576 of the tray carrier shown in FIGS. 32-34 is provided at the underside of the tray carrier 576 with engagement means configured for interaction with activation means of an export station as shown in FIG. 35, for example. The operating principle of the export member of a tray carrier in combination with activation means of an export or import station is shown in FIGS. 5, 6 and 7. In this specific example, the engagement means are formed by the engagement wheel 578 which is connected to the export member 576 via a pin 578b. The export member, the pin and the engagement wheel form a single entity which is movably suspended in the guide slot. By moving the engagement wheel at the bottom side of the support platform along the guide slot, the export member is moved at the upper side of the support platform in the import/export direction.

The activation means for moving the export member shown are formed by a guide rail 579, i.e. an activation rail, of an export station. The guide rail 579 extends at the level of the export station in the path of the tray carrier, at an angle to the conveyance direction. When the tray carrier is moved along the export station, the guide rail enters into contact with the engagement wheel and the guide rail forces the engagement wheel in a direction transverse to the conveyance direction. The ejector 76 is also moved with the engagement wheel from one end of the tray carrier 7 to the opposite end of the tray carrier.

The tray carrier 590 is also provided with an entrainment means 571, in this example a bar. The entrainment means 571 is connected here to the export member 576. The movement of the export member 576 also causes the entrainment means 571 to move for guiding a packaging tray when the packaging tray is imported into or exported from the tray carrier. The entrainment means 571 extends to a level above the support platform 508 of the tray carrier 590 and moves in conjunction with the export member between a retracted position (shown in FIG. 32) and an extended position (shown in FIG. 33).

An import station can be embodied in a simple manner as a result of the use of the entrainment means. For example, the import station does not have to be provided with means for advancing packaging trays in the conveyance direction, parallel to the conveyor track. When the tray carrier is moved along the import station, the entrainment means engages with a packaging tray arranged next to the conveyor track and moves the packaging tray parallel to the tray carrier over an import track in the conveyance direction. Using an entrainment means for guiding a packaging tray also allows the position of a packaging tray in the tray carrier to be monitored. When a packaging tray is imported, the entrainment means pushes against the packaging tray and the packaging tray is preferably pushed against the export body. The packaging tray can be pushed against the export body by import means of the import station, or as a result of the entrainment means being shaped and/or suspended in such a way as to push the packaging tray in the direction of the push-out body.

When the packaging tray is imported into the tray carrier, the packaging tray is positioned against the guide, and preferably also against the push-out member, thus determining the position of the packaging tray on the support platform. This allows treatment means, for example, for carrying out treatments on the packaging tray and/or the contents thereof to be embodied in a simple manner.

If, during conveyance, treatments are carried out on the packaging tray placed in the tray carrier and/or the contents thereof, it is beneficial if the location of the packaging tray on the support platform is fixed and corresponds at least broadly in all the tray carriers; for example, because a marinade shower can otherwise easily spray the marinade next to the packaging tray and/or the contents thereof. Because the position of the packaging trays in the tray carrier is fixed, the treatment means can also be placed at a fixed position and they do not have to be movably suspended, for example, and to be provided with location detection means for positioning the treatment means with respect to the packaging tray.

In the exemplary embodiment shown, the export means, in particular the export body, also function as import means. The export body and the entrainment means are movable between a conveyance position at one end of the support platform and an export position at the other end (in the export opening of the tray carrier) of the support platform. Connecting the entrainment means to the export member has the advantage that both can be activated using the activation means of the export member, so that no additional activation means have to be attached in the import station or export station.

In an alternative embodiment of the tray carrier, the entrainment means and the export member can also be operated separately. This has the advantage that they can be activated independently of each other. In a tray carrier of this type, only the entrainment means is moved into and out of the tray carrier during importing of a packaging tray, for example. During exporting of the packaging tray, only the push-out member is moved, for example, in the direction of the push-out opening for pushing the packaging tray out of the tray carrier. The entrainment means then remains in the retracted position during the exporting.

In the exemplary embodiment shown, the export member and the entrainment means are activated with the aid of an engagement wheel and a guide rail. In an alternative embodiment, the export member and/or the entrainment means can be driven with the aid of a drive, for example an electric, pneumatic or magnetic drive, forming part of the tray carrier.

As an alternative, the import stations and export stations can be provided with a drive which engages with the engagement means for activating the export member and/or the guide. The import station can for example also be provided with a cam track for guiding the engagement means in the form of a cam.

In the preferred embodiment shown, the tray carrier 590 is provided with a roof part 589 to which a connecting element 522 is attached for connecting the tray carrier 590 to a trolley. The tray carrier is suspended from a conveyor track via the trolley, preferably as shown in FIGS. 25 and 35.

The tray carrier 590 is connected to the trolley 513 via the connecting element 522. The connecting element 522 can for example be rigidly connected to the trolley 513. A rigid connection has the advantage that the tray carrier 590 has less freedom of movement so that fewer additional guide rails are necessary along the line in order to fix the position of the tray carrier. Alternatively, the connecting element 522 can be hingeably connected to the trolley 513 in such a way that the tray carrier can tilt about an axis transverse to the conveyance direction. A configuration of this type is particularly suitable for conveying in a horizontal position packaging trays along conveyor tracks having a, partially, diagonal course, as shown in FIG. 24. As a result of the weight of the tray carrier, the tray carrier hinges with respect to the point of suspension in such a way that the support platform continuously retains a horizontal position. This reduces the risk of products falling out of the open packaging trays during conveyance.

In the preferred embodiment shown, the connecting element 522 is also embodied as a sliding block for interaction with guide rails 523 on either side of the conveyor track, in accordance with the exemplary embodiment shown in FIG. 25. The guide rails 523 are attached at locations along the conveyor track where the tray carrier has to be stabilized in a direction perpendicular to the conveyance direction; for example, when a treatment is carried out on a packaging tray and/or the contents thereof, or when the export member is moved from a first is positioned to a second position during importing or exporting of the packaging tray.

In the preferred embodiment shown, the sliding block extends in the conveyance direction so as also to prevent rotation of the tray carrier about a vertical axis.

In the preferred embodiment shown, the tray carrier is provided, next to the connecting element 522, with a roof part 589 configured for interaction with the guide rails 523 for positioning the tray carrier 590. For this purpose, the roof part is provided with upright edges 591, the upper ens of which rests as a contact surface against the underside of the guide rails when the tray carrier is moved along the guide rails. As a result of the upright edge, the contact surface does not extend along the entire roof part, so the friction between the tray carrier and rails remains limited. This has the advantage that the loading of the drive of the conveyor system remains limited.

The preferred embodiment shown provides a contact surface to the left and right of the point of suspension of the tray carrier from the conveyor track so that the tray carrier is supported on both sides of the point of suspension, and tilting or wobbling transversely to the conveyance direction is prevented. A contact surface is also provided before and after the point of suspension so that tilting or wobbling of the tray carrier about an axis transverse to the conveyance direction is prevented.

At the sides, the roof part is also provided with a descending surface 592 in order to facilitate engagement of the guide rails 523 with the upright edges.

In an alternative embodiment, the connecting element or sliding block is shaped in such a manner as to engage with the underside of the guide rails in order in this way to prevent tilting of the tray carrier. In an embodiment of this type, the roof part does not have to engage with the guide rails and the surface area of the roof part can remain limited.

In the preferred embodiment shown, the support platform 508 and the roof part 589 of the tray carrier 590 are formed from folded sheet steel parts. The components can be manufactured in a simple manner, are relatively light and, in addition, easy to clean.

The export member is preferably made of plastics material, preferably a plastics material which is easy to clean and has a low coefficient of friction. In a further embodiment, in addition to or instead of the sliding surface, the tray carrier can be provided with wheels for rolling contact with the guide rails. Conversely, the guide rails can be provided with wheels for rolling contact with a contact surface of the tray carrier.

The tray carrier shown in FIGS. 32-34 is preferably used in combination with an import station 630 as shown in FIG. 35. The import station 630 comprises a supply track 651 provided with a buffer, an import track 653 and activation means 679 for displacing the export member/import member from a tray carrier.

The import station 630 is arranged parallel to a conveyor track 606 for conveying packaging trays in a conveyance direction indicated by arrow 600. The conveyor track 606 is provided with tray carriers 590 which are each suspended from the rail of the conveyor track 606 via a trolley 513. The trolleys 513 are connected to one another via a chain 575 in such a way that the tray carriers form an endless chain.

The import station 630 comprises a supply track 651 provided with a buffer. Packaging trays are buffered in this buffer until they can be imported into a tray carrier. The buffer is preferably activated by a control system which is configured for selectively letting through packaging trays. That is to say that the buffer detains a packaging tray until a tray carrier passes into which the packaging tray has to be imported. Whether or not the packaging tray is imported is preferably dependent on the information available in the memory of the control system about the packaging tray and/or the contents of the tray and/or the presence of a packaging tray in the passing tray carrier. In an alternative embodiment wherein all the passing tray carriers are empty, the buffer, in particular the control system, can be embodied in a simple manner for letting through a packaging tray for each passing tray carrier.

The exemplary embodiment shown provides a single buffer which lets through the packaging trays in the order in which they arrive. An alternative embodiment can provide two or more buffers of this type next to one another, each buffer buffering for example a packaging tray having specific contents for delivery to the import track. Thus, one buffer can be configured for supplying empty packaging trays and a second buffer can be configured for supplying packaging trays already filled with meat products.

The supply track 651 is provided with driven rolls 603 which move a packaging tray in the direction of the conveyor track 606. The buffer is provided with a movable detainer 601 arranged between two rolls. In order to let through a packaging tray, the detainer is moved downward between the rolls. The rotating rolls of the supply track 651 move the packaging tray in the direction of the conveyor track 606, the packaging tray passing along the top of the detainer. As soon as the packaging tray has passed, the detainer moves upward again for detaining the following packaging tray. An advantage of a movable detainer 601 of this type is that the detainer can be coupled to a control system preferably comprising information about the packaging tray and/or the tray carriers. The detainer can then be moved on the basis of this information so that trays can be selectively supplied to the tray carriers.

In an alternative embodiment, the buffer is not provided with a detainer of this type. In that case, a series of successive packaging trays are produced in the buffer and continuously supplied to successive tray carriers.

Detainers 602, which detain the packaging tray pushed onward by the rotating rolls in a position adjoining the conveyor track 606, are provided at the end of the supply track 651. In this position, an entrainment means of a tray carrier advanced in the conveyor track can engage with the packaging tray and advance the packaging tray parallel to the direction of conveyance of the conveyor track.

The preferred embodiment shown provides a plurality of tiltable detainers 602. The detainers 602 are rotatably suspended from a shaft (not shown) extending perpendicularly to the conveyance direction. The detainers 602 block the advancement of a packaging tray in the supply direction perpendicular to the conveyance direction, but yield under the pressure of an entrainment means of a passing tray carrier. The detainers can thus detain the packaging trays without impeding the passage of the entrainment means. The detainers 602 are also provided with a spring element for returning to the starting position for detaining the packaging tray after the entrainment means has passed. In an alternative embodiment, the detainers are embodied and suspended in such a way as to move under the influence of gravity in the vertical detaining position.

In an alternative embodiment, a sill, which is sufficiently low that the guides move over it, but high enough to detain packaging trays, is for example provided at the end of the supply track. In an embodiment of this type, no movable components are necessary for detaining the packaging trays, thus reducing the risk of wear and malfunctions.

The packaging tray, which is positioned against the detainers, is advanced by the entrainment means from the supply track 602 onto the import track 653. The import track 653 is arranged parallel to the conveyor track 606. The import track 653 extends at a level substantially equal to the level of the support member of the tray carrier 590. The import track is configured for exerting an importing force on a packaging tray for moving a packaging tray in the tray carrier. For this purpose, in the exemplary embodiment shown, the import track is provided with rolls 638 which are positioned at an angle to the direction of conveyance 600 of the tray carriers 570. When a packaging tray is moved parallel to the tray carriers 590 over the import track 653, the rolls 638 exert, as a result of this arrangement, a force on the packaging trays that pushes the packaging trays into the tray carriers 590 transversely to the conveyance direction 600. As a result of the position of the rolls with respect to the conveyor track, in particular the conveyance direction, the rolls do not have to be driven, for example by an electric motor, for feeding the packaging trays into the tray carrier. As a result, an import track of this type is simple and inexpensive to manufacture and does not have to be connected to the electricity grid.

In an alternative embodiment, a driven conveyor belt, a pusher body driven by a hydraulic or pneumatic cylinder, or driven rolls extending parallel to the conveyance direction can for example be provided for moving the packaging trays in the tray carriers. An embodiment of this type with driven rolls can for example be implemented by placing the driven rolls 603 of the supply track 651 over the full width of the import station 630. The use of rolls instead of a conveyor belt, for example, has the advantage that a packaging tray which is moved over the rolls by the entrainment means in the conveyance direction experiences relatively low friction. As a result, the drive of the conveyor track is loaded less when the entrainment means of the tray carriers move packaging trays over the import track.

The import station shown in FIG. 35 is also provided with activation means for positioning the export member of the tray carriers, and in particular the entrainment means connected to the import member, in a desired position.

Upstream with respect to the supply track 651, the import station 630 is provided with activation means (not shown) which move the export members of the passing tray carriers in a position for engaging with a packaging tray and entraining said packaging tray in the conveyance direction.

Parallel to the import track, the import station is provided with activation means 679 for moving the export member and the entrainment means inward after engagement with a packaging tray. The export member and the entrainment means then guide the packaging tray during importing into the tray carrier.

In the exemplary embodiment shown, the activation means are embodied, upstream of the import track, for selectively activating the export members. The guide rail for activating the export members is preferably movably suspended in such a way as to be able to be moved into and out of the track of an engagement wheel of a passing tray carrier in the vertical direction and/or in the horizontal direction. Only when a tray carrier passes into which a packaging tray has to be imported are the activation means moved in the track of the tray carriers for interaction with the engagement means of the push-out member of said tray carrier.

When, for example, a tray carrier passes that is already provided with a packaging tray, then the guide rails are moved out of the track of the tray carrier. The push-out member of the tray carrier is then not moved and the tray carrier passes the import station without the entrainment means engaging with a packaging tray. In FIG. 35, the tray carrier 590D passes the import station without the entrainment means being activated.

The activation means 679 are preferably fixedly embodied in such a way that, for all the tray carriers passing the import track with the guide extended, the guide is returned to the retracted position; this is to prevent the tray carrier from being left hanging anywhere during conveyance with the guide. The engagement wheel of a tray carrier with the push-out body in the conveyance position passes the guide rail without the guide rail engaging with the engagement wheel.

The activation means for selectively activating the export means of the tray carriers are preferably activated by a control system of the conveyor system. In a preferred embodiment, a central control system of this type keeps a record, for all the tray carriers, as to whether they are provided with a packaging tray. For example, the one or more import stations can inform the control system which tray carrier they have imported a packaging tray into. In an alternative embodiment, the control system is provided with sensors for scanning the tray carriers.

For example, it is easily possible to determine, by firstly scanning the tray carriers upstream and downstream with respect to an import station, whether a packaging tray has been imported into the import station in question. The central control system is preferably configured for storing in memory means which import station each packaging tray originates from, and thus what type of food product and/or packaging tray it is.

The information can be passed on to a control system of a stand-alone import station via the control system. In an alternative embodiment, the central control system is configured for directly activating the import stations and/or export stations on the basis of this information.

Figure 36:
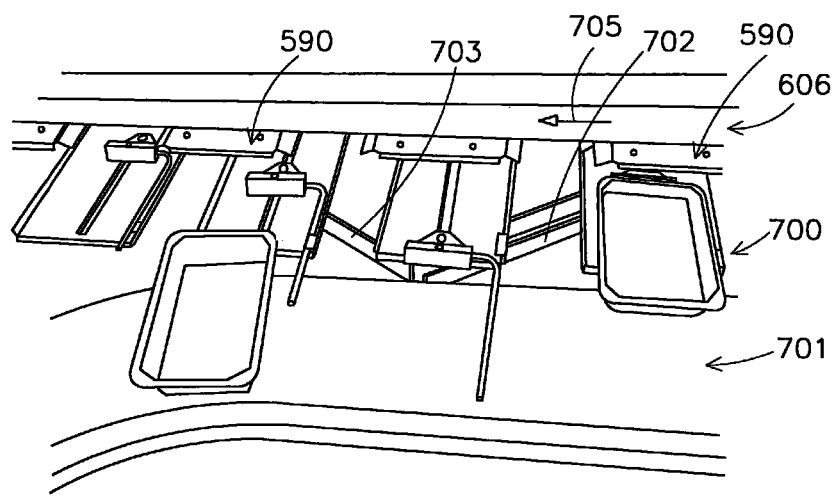
FIG. 36 shows an export station for exporting a packaging tray from the tray carrier from FIG. 32.

FIG. 36 shows a preferred embodiment of an export station 700 for exporting packaging trays from a tray carrier 590 as shown in FIGS. 32-34.

The export station 700 comprises an export track 701 extending at least partially parallel to the conveyor track 606 and at a level substantially equal to the level of the support platform of the tray carrier 590. The export station comprises activation means 702, 703 for activating the export member of the tray carrier.

The export station is provided with activation means in the form of a first guide rail 702 for interacting with the export means of the tray carrier for moving a packaging tray out of the tray carrier. A second guide rail 703 is positioned downstream of this guide rail 702 for moving, in the starting position, the push-out member and the entrainment means of the tray carrier.

In the exemplary embodiment shown, the export track 701 is embodied as a conveyor belt constructed from connected elements. The conveyor belt extends partially parallel to the conveyor track 606. The conveyor track 606 and the export track 701 are advanced in the direction indicated by arrow 705.

The conveyor track is preferably advanced at a speed somewhat higher than the conveying speed of the tray carriers. When the activation means force the push-out member in the direction of the import/export opening, the packaging tray is pushed out of the tray carrier, on the export track next to the tray carrier. When the export member has been moved to the outermost position and the packaging tray rests on the export track, the push-out member is forced back into the tray carrier by activation means. As a result of the somewhat higher speed of the conveyor belt with respect to the tray carrier, the packaging tray placed on the conveyor belt comes loose of the guide while the guide is returned to the starting position. The higher speed of the export track prevents the entrainment means from partially pushing onward during retraction. This might cause the packaging tray to be positioned obliquely on the export track.

In an alternative (not shown), the export track is embodied as a roll track. A roll track of this type also partially extends parallel to the conveyor track and is placed somewhat at an inclination. The roll track descends in this case in the advancement direction. When the packaging tray rests in this embodiment on the export track, the packaging tray will advance of its own accord over the export track under the influence of gravity. An advantage of an embodiment of this type is that no drive means are necessary for the export track.

In order to distinguish between guide rails for stabilizing the tray carrier and guide rails for activating the export means of a tray carrier, the former may be designated by the term "stabilization rails" and the latter by the term "activation rails".

Preferably, all the import stations, export stations and treatment stations are configured for conveying a packaging tray in a substantially horizontal position. The stations are thus suitable for use with an open packaging tray filled with food products.

In the context of this application, the term "a packaging tray" refers to a tray forming part of the final packaging of the food product placed in the tray, in particular the packaging in which the product is purchased by a consumer. All references to a "filled packaging tray" may also relate to a partially filled packaging tray.

Preferably, the packaging tray is at least partially made of plastics material, metal or cardboard, or of a combination, for example a laminate, of these materials. A packaging tray preferably comprises a plastics material selected from polystyrene, polypropylene, polyester, polyethylene, polyvinyl chloride.

The packaging tray comprises a bottom and a circumferential wall, and is open at the upper side for placing products. Preferably, the tray is sealed by attaching a film over the opening of the tray. The film is preferably adhesively bonded to the tray, for example to an edge along the opening.

A conveyor system according to the invention is preferably suitable for conveying packaging trays having a width of from 100 to 400 mm inclusive, preferably from 130 to 185 mm inclusive, having a length of from 100 to 400 mm inclusive, preferably from 130 to 285 mm inclusive, and having a height of from 10 to 200 mm, preferably from 30 to 120 mm.

The invention also relates to a conveyor system configured for conveying packaging trays, for food products for example, from one or more import stations to one or more export stations, the conveyor system being provided with:
  an endless conveyor track comprising a rail;
  a multiplicity of trolleys which are movably connected to the rail and are preferably connected to one another, for example via chain elements,
  a multiplicity of tray carriers which are each coupled to the rail via at least one trolley for forming a chain of tray carriers, wherein each tray carrier is provided with a support member, preferably a support platform, configured for supporting at least one packaging tray;
  drive means configured for displacing the chain of tray carriers in a direction of conveyance along the conveyor track;
  at least one import station configured for, preferably selectively, importing the packaging trays into the tray carriers; and
  at least one export station configured for, preferably selectively, exporting the packaging trays from the tray carriers.

Preferably, at least one export station of this conveyor system comprises an export device for exporting, preferably in a position with a substantially horizontal orientation, the packaging trays from the tray carriers.

In an advantageous embodiment, this conveyor system comprises export means configured for engaging with a packaging tray supported by a support member of a tray carrier and for exerting an exporting force, for example a pushing force, on said packaging tray for exporting said packaging tray in a controlled manner from the carrier at an export station.

In an advantageous embodiment, the export station is provided with export means and the tray carriers have no export means.

In a further embodiment, the export device comprises an export track, for example a conveyor belt or an export platform, which extends at least partially parallel to a part of the endless conveyor track and/or which at least partially coincides with the endless conveyor track in such a way that a packaging tray in a position with a preferably substantially horizontal orientation can be exported to the export track from a tray carrier.

Preferably, the export track extends at least partially at a level substantially equal to the level of the support member of a tray carrier in such a way that a packaging tray can be displaced in a substantially horizontal direction from a position on the support member of said tray carrier to a position on the export track.

In a further embodiment, at least a part of the export track coincides with the conveyor track, that part of the export track extending in the conveyance direction from a level somewhat below the level of the support member of the tray carrier to a level somewhat above the level of the support member of the tray carrier, and the support member being shaped for interaction with the export track for exporting a packaging tray in such a way that when the tray carrier passes the export platform, the export platform engages with the packaging tray on the support member of said tray carrier and takes over the supporting of the packaging tray from the support member.

In a further embodiment, the support member of a tray carrier is configured for supporting a packaging tray below a part of the packaging tray positioned above the bottom of the packaging tray, for example below a flange along the opening of the packaging tray, and the export track at least partially extending at a level substantially equal to the level of the bottom of the packaging tray which is supported by the support member of the tray carrier.

In an advantageous embodiment, at least one import station of the conveyor system comprises an import device for importing, preferably in a position with a substantially horizontal orientation, the packaging trays into the tray carriers.

In an advantageous embodiment, the conveyor system comprises import means configured for engaging with a packaging tray in the at least one import station and exerting an importing force, for example a pushing force, on said packaging tray for importing in a controlled manner said packaging tray into a tray carrier which is advanced next to or above the import station. The at least one import station is in this case preferably provided with import means and the tray carriers do not have any import means.

In an advantageous embodiment, the import device comprises an import track, for example a conveyor belt or an import platform, which extends at least partially parallel to a part of the endless conveyor track and/or which at least partially coincides with the endless conveyor track in such a way that a packaging tray in a position with a preferably substantially horizontal orientation can be imported from the import track to a tray carrier.

In a further advantageous embodiment, the import track at least partially extends at a level substantially equal to the level of the support member of a tray carrier in such a way that a packaging tray can be displaced in a substantially horizontal direction from a position on the import track to a position on the support member of said tray carrier.

In a further advantageous embodiment, the support member of a tray carrier is configured for supporting a packaging tray below a part of the packaging tray positioned above the bottom of the packaging tray, for example below a flange along the opening of the packaging tray. In this embodiment, the import track extends at least partially at a level substantially equal to the level of the bottom of the packaging tray which is supported by the support member of the tray carrier.

In an advantageous embodiment, the import track comprises a conveyor belt provided with a drive, for advancing the conveyor belt at a first speed, and positioning elements extending substantially transversely to the direction of advancement of the conveyor belt for positioning packaging trays in line with the tray carriers. Preferably, a drive is also provided for advancing the positioning elements at a second speed, which is substantially equal to the speed of the tray carriers, for positioning packaging trays placed on the conveyor belt in line with the tray carriers.

In a further embodiment, the positioning elements are provided with import means in the form of import members which can move along the positioning elements for displacing a packaging tray positioned against the positioning element along that positioning element in a direction transverse to the direction of advancement of the import track.

In an alternative embodiment, import means are provided in the form of a guide extending above the import track for guiding a packaging tray advanced on the import track in a direction transverse to the direction of advancement of the conveyor track.

In an advantageous embodiment, the import station is provided with import means with a wheel which is suspended so as to be rotatable about a substantially vertical axis and is provided with import members fastened thereto, rotation of the wheel causing the import members to be moved at the same time in conjunction with a packaging tray on the import track in the conveyance direction and in a direction transverse to the conveyance direction for displacing a packaging tray from the import track into a tray carrier.

Preferably, the import members are provided with a push surface for engaging with a packaging tray, the import members being suspended so as to be rotatable about a vertical axis in such a way that the push surface continuously extends perpendicularly to the import direction of the packaging trays.

In an advantageous embodiment, the at least one import station comprises a buffer for buffering packaging trays, the buffer being configured for selectively delivering packaging trays to the import track in such a way that each tray is delivered to a specific tray carrier in the conveyor track.

In an advantageous embodiment, the import stations and/or the export stations of the conveyor system are embodied as stand-alone import stations and export stations respectively, each comprising detection means for detecting passing tray carriers and/or packaging trays in said tray carriers and/or the contents of said packaging trays, and a control system for activating on the basis of said information the import means and export means respectively for selectively importing and exporting respectively packaging trays.

Preferably, the conveyor system is provided with a control system comprising:
  chain position determining means for determining the position of the chain of tray carriers with respect to a fixed point along the endless conveyor track, for example an import station, an export station or a treatment station;
  receiving means for receiving information about tray carriers and/or product information concerning the packaging trays and/or the contents of packaging trays, which information is received by, for example, an import station, an export station, a treatment station or a processing system; and
  electronic memory means with a memory table comprising, for each packaging tray in the conveyor system, at least one memory field for accommodating at least one item of data which is related to the packaging tray and/or contents of the packaging tray, and comprising at least one memory field for storing a variable which is representative of the tray carrier in which the packaging tray is placed at an import station.

Preferably, the chain position determining means comprise:
- at least a single reference chain element provided with an identification mark, which reference chain element forms part of the chain of trolleys and tray carriers;
- a recognition sensor, arranged along the conveyor track, for detecting the reference chain element; and
- a counting device for counting the tray carriers which pass after the reference chain element has passed.

A further embodiment provides tray carrier identification means pertaining to at least one tray carrier in the chain of tray carriers, for example an identification code suitable for contactless detection, for example magnetic, inductive, optical or radiographic detection.

In a further embodiment, the conveyor system is configured for adding tray identification means to the packaging trays, for example by printing a code on the packaging tray, sticking an identification sticker to the packaging tray or adding an insert object, for example an (absorbent) insert, provided with an identification code, to the packaging tray.

In an advantageous embodiment, the conveyor system is provided with two or more import stations, a specific type of food product and/or packaging tray being imported for each import station, and the control system being configured for storing in memory means which import station each packaging tray originates from.

In a further embodiment, the control system comprises sending means for sending information about tray carriers and/or packaging trays and/or the contents of the packaging trays, for example to a treatment station, an export station or a printer of a packaging station.

Preferably, the control system is configured as a distribution control system for activating two or more export stations, for distributing packaging trays over a plurality of export stations.

In an advantageous embodiment, one or more tray carriers are configured in such a way that the support member has a fixed, preferably substantially horizontal, orientation for conveying a packaging tray in a position with a substantially horizontal orientation.

One embodiment also makes provision for the tray carriers to rest on the trolleys in such a way that the support member of a tray carrier is positioned higher than the rail, and a packaging tray placed on that support member is conveyed along the top of the rail.

An alternative embodiment makes provision for one or more tray carriers to be suspendedly coupled to one or more trolleys in such a way that the support member of a tray carrier is positioned lower than the rail, and a packaging tray placed on that support member is conveyed below the rail.

In an advantageous embodiment, the conveyor system is provided with export means attached to the tray carriers. Preferably, the export means are configured for interacting with associated activation means of an export station.

Preferably, the tray carrier is provided with at least one movable export member, for example a pusher body, for exporting a packaging tray from the tray carrier at an export station.

In an advantageous embodiment, the at least one movable export member is also movable, for example rotatable, between an active position, in which the export member can engage with the packaging tray, and an inactive position, for example a retracted position.

Preferably, the tray carrier is provided with a guide, for example a guide rail, which is operative in a direction substantially transverse to the direction of conveyance of the chain of tray carriers, for guiding at least one export member, for example in such a way that the export member is displaceable along the longitudinal axis of the guide rail and is not rotatable about the longitudinal axis of the guide rail. Preferably, the tray carrier has a support member and the guide rail extends below the support member, and the support member being provided with a slot in such a way that the export member, for example the pusher body, extends in the active position to above the support member and can be moved in said position along the guide rail.

In a further embodiment, the guide rail is at least partially movable in a direction perpendicular to the support member for displacing the export member between the active position, in which the export member extends to above the support member via the slot, and the inactive position, in which the export member is located below the support member.

The guide rail is in this case preferably suspended so as to be rotatable about its longitudinal axis in such a way that the guide rail can be rotated between an active position, in which the export member extends to above the support member via the slot, and an inactive position, in which the export member is located below the support member.

Preferably, the guide rail supports a first and a second export member both extending in a radial direction with respect to the longitudinal axis of the guide rail, and the first and the second export members being attached, viewed in a direction along the longitudinal axis of the guide rail, in a staggered manner with respect to each other, in such a way that the guide rail can be rotated between a first position, in which the first export member extends to above the support member via the slot, and a second position, in which the second export member extends to above the support member via the slot.

In an advantageous embodiment, the conveyor system is provided with one or more tray carriers configured for accommodating and delivering trays in a substantially sideways direction with respect to the direction of advancement of the chain of tray carriers, preferably at both sides of the conveyor track.

In an advantageous embodiment, one or more tray carriers are provided with positioning means for positioning a packaging tray on the support member, for example a guide or positioning rib which engages with the side of the packaging tray when the packaging tray is slid into the tray carrier for guiding a packaging tray to a desired position while said packaging tray is imported into the tray carrier.

Preferably, one or more tray carriers are provided with fixing means for fixing a packaging tray with respect to the support member in such a way that the packaging tray is not displaced with respect to the support member, for example when a treatment is carried out on the packaging tray and/or the contents thereof.

Preferably, one or more tray carriers are provided with a screen, for example a side wall transverse to the conveyance direction and/or optionally an upper wall, for protecting a packaging tray and/or the contents thereof from the environment, for example against environmental influences, for example during the application of a preservative or a marinade or a food product in the tray supported by an adjacent tray carrier.

Preferably, one or more tray carriers, preferably all the tray carriers, are configured in such a way that a packaging tray placed in the tray carrier is accessible to treatment means of a treatment device arranged along the conveyor track, for carrying out a treatment on the packaging tray and/or the contents thereof, for example treatment means for applying a preservative or a marinade to a food product, or for printing a code on the packaging tray.

Preferably, one or more tray carriers are provided with a movable support member for engaging with a packaging tray and for carrying said packaging tray. In this case, the one or more tray carriers are preferably configured for at the bottom side engaging and/or delivering packaging trays.

In an advantageous embodiment, one or more tray carriers are provided with one or more support members, for example support platforms at various heights, each suitable for supporting one or more packaging trays.

In an advantageous embodiment, the conveyor system is configured for conveying a packaging tray in an open state, at least along a part of the conveyor track, so that one or more food products can be placed in the tray and/or a treatment can be carried out on the products placed in the tray.

An advantageous embodiment also provides one or more treatment stations arranged along the conveyor track, each comprising a treatment device for performing, for example, one or more of the following treatments on one or more of the passing packaging trays and/or the food products in said packaging trays:

weighing the trays,
sealing the tray with a film,
applying a code to the tray,
adding an edible additive, for example a liquid additive such as a marinade,
adding an object, for example an insert, for example an absorbent insert,
filling trays with food products,
adding a food product,
scanning the trays.

Preferably, the tray carriers are configured in such a way that a packaging tray placed in the tray carrier is accessible to treatment means of a treatment device arranged along the conveyor track and the treatment station is arranged in line with the conveyor track and configured for performing the action on a tray placed in a tray carrier and/or the food products placed in the tray.

In an alternative embodiment, a treatment station is arranged parallel to the conveyor track between an import station and an export station and is configured for exporting the packaging trays from the tray carriers via the export station prior to the treatment and importing packaging trays on the tray carriers into the tray carriers via the import station following the treatment.

Preferably, a treatment station is activated by a control system configured for selectively exporting the packaging trays from the tray carriers and selectively importing the packaging trays into the tray carrier, wherein the exporting of the packaging tray from the conveyor track, and/or the treatment, is dependent on the information available in the memory of the control system about the tray and/or the contents of the tray.

Preferably, the conveyor system is configured for conveying food products placed in packaging trays, the packaging trays forming part of the final consumer packaging.

Preferably, the conveyor system is configured for use in the food products processing industry, for example the meat processing industry, for example the poultry processing industry.

The invention also relates to a processing system for processing food products, preferably meat products, which system comprises:

a processing device configured for processing food products;
at least one filling station configured for filling packaging trays with food products supplied from the processing device;
a conveyor system configured for conveying packaging trays from one or more import stations to one or more export stations, comprising:
an endless conveyor track comprising a rail;
a multiplicity of trolleys and tray carriers, which tray carriers are each coupled to the rail via at least one trolley for forming a chain of tray carriers, wherein each tray carrier is provided with a support member, preferably a support platform, configured for supporting at least one packaging tray;
drive means configured for displacing the chain of tray carriers in a direction of conveyance along the conveyor track;
at least one import station configured for, preferably selectively, importing the packaging trays into the tray carriers;
at least one export station configured for, preferably selectively, exporting the packaging trays from the tray carriers; and
a control system for activating the conveyor system, configured for determining the position of each tray in the conveyor system, which control system comprises:
chain position determining means for determining the position of the chain of tray carriers with respect to a fixed point along the conveyor track, for example an export station; and
receiving means for receiving information about tray carriers and/or product information concerning the packaging trays and/or the contents of packaging trays, which information is received by, for example, an import station, an export station, a treatment station or a processing system; and
electronic memory means with a memory table comprising, for each packaging tray in the conveyor system, at least one memory field for accommodating at least one item of data which is related to the packaging tray and/or contents of the packaging tray, and comprising at least one memory field for storing the tray carrier in which the packaging tray is placed at an import station.

The control system is in this case preferably configured as a distribution control system for activating two or more export stations, for distributing packaging trays over a plurality of export stations.

Preferably, the at least one filling station is in this case configured to distribute the food products over the packaging trays on the basis of product information, for example weight.

Preferably, the at least one filling station is provided with filling means for systematically placing the food products in the tray at a certain location and/or in a certain order, in such a way that the position of each placed food product in the packaging tray is known. Preferably, the at least one filling station is in this case configured for filling packaging trays outside the tray carriers, and the filling station comprises:

conveyor means for supplying food products;
conveyor means, for example a conveyor belt, for supplying a tray in a filling position;
conveyor means for discharging a filled tray from the filling position to an import station for importing the filled tray into a tray carrier; and
wherein the filling means are configured for placing one or more food products in a tray placed in the filling position.

The invention also relates to a method wherein packaging trays filled with food products are conveyed with the aid of a system described hereinbefore.

The invention also relates to an abattoir facility, preferably a poultry abattoir, provided with a system as described hereinbefore.

The invention claimed is:

1. A food processing system for processing food products, comprising:
   a food processing device for processing food products;
   at least one filling station;
   an overhead conveyor system configured for conveying packaging trays, for food products from one or more import stations to at least one of multiple export stations, wherein the packaging trays are at the at least one filling station filled with food products supplied by the processing device for processing food products, the overhead conveyor system comprising:
      an endless conveyor track comprising a rail extending in a direction of conveyance;
      a multiplicity of trolleys which are movably connected to the rail and are connected to one another;
      a multiplicity of tray carriers each coupled to the rail via at least one trolley for forming a chain of tray carriers, wherein each tray carrier is provided with a support platform configured for supporting at least one packaging tray, and wherein each tray carrier is suspendedly coupled to one or more trolleys in such a way that the support platform of each tray carrier is positioned below the rail and the packaging tray placed on the support platform is conveyed along the bottom of the rail;
      a drive device configured for continuously displacing the chain of tray carriers in the direction of conveyance along the conveyor track;
      at least one import station configured for importing the packaging trays into the tray carriers;
      multiple export stations located along the endless conveyor track and configured for selectively exporting the packaging trays from the tray carriers, each of the multiple export stations being provided with an export track extending in the direction of conveyance along a part of the endless conveyor track, wherein the export track has a horizontal support surface with respect to a ground level, corresponding to the support platform of a passing tray carrier, configured to receive the packaging tray released from the support platform of the passing tray carrier in a horizontal direction with respect to the ground level while the tray carriers are continuously moved along the endless conveyor track;
      an export device provided on each tray carrier and/or at each export station, configured for pushing a packaging tray from a tray carrier onto a corresponding export track in the horizontal direction while the tray carriers are continuously moved along the endless conveyor track; and
      a distribution control system configured for linking product information, in the form of one or more characteristics of the tray and/or the food products in said tray, to each individual packaging tray, and for activating the overhead conveyor system, the at least one filling station, the food processing device, and the export devices, the distribution control system comprising:
         a chain position determining device configured to determine the position of each of the tray carriers with respect to a fixed point along the endless conveyor track; and
         a receiving device configured to receive information about tray carriers and/or product information concerning the packaging trays and/or the contents of packaging trays, which information is received from an import station, an export station, and/or a treatment station; and
         an electronic memory storage device with a memory table comprising, for each tray carrier in the overhead conveyor system, at least one memory field for accommodating at least one item of data which is related to the packaging tray and/or contents of the packaging tray, and comprising at least one memory field for storing a variable which is representative of the tray carrier in which the packaging tray is placed at an import station.

2. The food processing system according to claim 1, wherein the export device is configured for engaging with a packaging tray supported by a support platform of a tray carrier and for exerting an exporting force on said packaging tray for exporting said packaging tray in a controlled manner from the carrier at an export station.

3. The food processing system according to claim 2, wherein the export device is attached to the tray carriers in the form of at least one movable export member for exporting a packaging tray from the tray carrier at an export station.

4. The food processing system according to claim 3, wherein the export device is configured for interacting with an associated activation device of an export station.

5. The food processing system according to claim 1, wherein at least one import station comprises an import device for importing the packaging trays into the tray carriers, the import device also comprising an import track, which extends parallel to a part of the endless conveyor track and extends at a level substantially equal to the level of the support platform of a tray carrier in such a way that a packaging tray can be displaced in a substantially horizontal direction from a position on the import track to a position on the support platform of said tray carrier.

6. The food processing according to claim 5, wherein the import device is configured for engaging with a packaging tray in the at least one import station and exerting an importing force on said packaging tray for importing said packaging tray in a controlled manner into a tray carrier which tray carrier next to or above the import station is advanced in the direction of conveyance along the conveyor track, the import device being embodied as a series of rollers which are arranged in parallel and together form at least a part of the import track and which extend in a horizontal plane at an angle in such a way that when a packaging tray is moved over the rollers in the conveyance direction, the rollers exert a force on the packaging tray at an angle to the conveyance direction.

7. The food processing system according to claim 1, wherein an import device is attached to the tray carriers in the form of an entrainment device configured to engage with a packaging tray, for importing a packaging tray into the tray carrier at an import station.

8. The food processing system according to claim 7, wherein the import device is configured for interacting with an associated activation device of an import station.

9. The food processing system according to claim 1, wherein one or more tray carriers are provided with a positioning device configured to position a packaging tray on the support platform, the positioning device being a guide or positioning rib which engages with the side of the packaging tray when the packaging tray is slid into the tray carrier for guiding a packaging tray to a desired position while said packaging tray is imported into the tray carrier.

10. The food processing system according to claim 1, wherein, in one or more tray carriers, the support platform or platform is connected to a roof part via just a wall in such a way that the packaging tray and/or any contents of said packaging tray is/are accessible from three sides to a treatment mechanism of a treatment device arranged along the conveyor track, for carrying out a treatment on the packaging tray and/or the contents thereof.

11. The food processing system according to claim 10, wherein the treatment station is arranged in line with the conveyor track and is configured for performing the action on a tray placed in a tray carrier and/or the food products placed in the tray.

12. The food processing system according to claim 1, also provided with one or more treatment stations arranged along the conveyor track, each comprising a treatment device for performing one or more of the following treatments on one or more of the passing packaging trays and/or the food products in said packaging trays:
weighing the trays,
sealing the tray with a film,
applying a code to the tray,
adding an edible additive,
adding an object,
filling trays with food products,
adding a food product, and
scanning the trays.

13. The food processing system according to claim 12, wherein a treatment station is arranged parallel to the conveyor track between an import station and an export station and is configured for exporting the packaging trays from the tray carriers via the export station prior to the treatment and importing packaging trays into the tray carriers via the import station following the treatment.

14. The food processing system according to claim 12, wherein a treatment station is activated by a control system configured for selectively exporting the packaging trays from the tray carriers and selectively importing the packaging trays into the tray carrier and wherein the exporting of the packaging tray from the conveyor track, and/or the treatment on the packaging tray and/or the contents thereof, is dependent on the information available in the memory of the control system about the tray and/or the contents of the tray.

15. The food processing system according to claim 1, in combination with one or more packaging trays.

16. The food processing system according to claim 1, wherein the packaging trays are part of the final consumer packaging.

17. The food processing system according to claim 1, wherein the horizontal support surface of the export track is substantially level with the support platform of the tray carriers passing the corresponding export stations.

18. The food processing system according to claim 1, wherein the support platform of each of the tray carriers maintains a horizontal orientation with respect to the ground level during importing the packaging trays at the import stations and during exporting the packaging trays at the multiple export stations.

19. The food processing system according to claim 1, wherein the distribution control system is further configured to select, for each packaging tray being transported, one of the multiple export stations and activate the selected export station to export the packaging tray from the corresponding tray carrier in which the packaging tray is transported, based on the data for each tray carrier saved in the electronic memory storage device.

20. A method comprising the steps of:
providing the food processing system according to claim 1;
processing a food product using the food processing device;
filling the packaging tray with the food product at the filling station;
importing the packaging tray with the food product into one of the tray carriers at the at least one import station;
conveying the packaging tray with the food product along the conveying track; and
exporting the packaging tray with the food product at one of the multiple export stations.

21. The method according to claim 20, wherein the packaging trays form part of the final consumer packaging, wherein one or more treatment stations are arranged along the conveyor track, and wherein one or more treatments are carried out on the food product in the packaging tray and/or on the packaging tray by the one or more treatment stations while the packaging tray is conveyed by a tray carrier along the conveyor track.

22. An abattoir provided with the food processing system according to claim 1.

23. A conveyor system configured for conveying packaging trays, for food products from one or more import stations to at least one of multiple export stations, the conveyor system comprising:
an endless conveyor track comprising a rail extending in a direction of conveyance;
a multiplicity of trolleys which are movably connected to the rail and are connected to one another;
a multiplicity of tray carriers each coupled to the rail via at least one trolley for forming a chain of tray carriers, wherein each tray carrier is provided with a support platform configured for supporting at least one packaging tray, and wherein each tray carrier is suspendedly coupled to one or more trolleys in such a way that the support platform of each tray carrier is positioned below the rail and the packaging tray placed on the support platform is conveyed along the bottom of the rail;
a drive device configured for continuously displacing the chain of tray carriers in the direction of conveyance along the conveyor track;
at least one import station configured for importing the packaging trays into the tray carriers;
multiple export stations located along the endless conveyor track and configured for selectively exporting the packaging trays from the tray carriers, each of the multiple export stations being provided with an export track extending in the direction of conveyance along a part of the endless conveyor track, wherein the export track has a horizontal support surface with respect to a ground level, corresponding to the support platform of a passing tray carrier, configured to receive the packaging tray released from the support platform of the passing tray carrier in a horizontal direction with respect to the ground level while the tray carriers are continuously moved along the endless conveyor track;
an export device provided on each tray carrier and/or at each export station, configured for pushing a packaging tray from a tray carrier onto a corresponding export track in the horizontal direction while the tray carriers are continuously moved along the endless conveyor track; and
a distribution control system configured for linking product information, in the form of one or more characteristics of the tray and/or the food products in said tray, to each individual packaging tray, and for activating the conveyor system and the export devices, the distribution control system comprising:

a chain position determining device configured to determine the position of each of the tray carriers with respect to a fixed point along the endless conveyor track; and a receiving device configured to receive information about tray carriers and/or product information concerning the packaging trays and/or the contents of packaging trays, which information is received from an import station, an export station, and/or a treatment station; and an electronic memory storage device with a memory table comprising, for each tray carrier in the conveyor system, at least one memory field for accommodating at least one item of data which is related to the packaging tray and/or contents of the packaging tray, and comprising at least one memory field for storing a variable which is representative of the tray carrier in which the packaging tray is placed at an import station.

* * * * *